US007509442B2

United States Patent
Wada et al.

(10) Patent No.: US 7,509,442 B2
(45) Date of Patent: Mar. 24, 2009

(54) INFORMATIONAL-SIGNAL-PROCESSING APPARATUS, FUNCTIONAL BLOCK, AND METHOD OF CONTROLLING THE FUNCTIONAL BLOCK

(75) Inventors: Seiji Wada, Kanagawa (JP); Tetsujiro Kondo, Tokyo (JP); Yoshihiro Wakita, Tokyo (JP); Takuya Oshima, Tokyo (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 11/565,225

(22) Filed: Nov. 30, 2006

(65) Prior Publication Data

US 2007/0133066 A1    Jun. 14, 2007

(30) Foreign Application Priority Data

Dec. 9, 2005   (JP) .............................. 2005-356750

(51) Int. Cl.
*G06F 3/00* (2006.01)
*G06F 13/12* (2006.01)
(52) U.S. Cl. .............................. 710/20; 710/62; 712/16
(58) Field of Classification Search ............. 710/20–21, 710/29, 45, 72–74, 62–64, 305; 712/14–22
See application file for complete search history.

(56) References Cited

U.S. PATENT DOCUMENTS

| 3,970,993 | A | * | 7/1976 | Finnila ......................... 712/14 |
| 4,395,698 | A | * | 7/1983 | Sternberg et al. ............ 382/308 |
| 5,986,964 | A | * | 11/1999 | Ariki et al. ............. 365/230.03 |
| 6,218,861 | B1 | * | 4/2001 | Sudo et al. ..................... 326/46 |
| 6,317,804 | B1 | * | 11/2001 | Levy et al. .................... 710/305 |
| 6,785,800 | B1 | * | 8/2004 | Yamaura et al. ............... 712/22 |
| 2002/0023201 | A1 | * | 2/2002 | Saulsbury et al. ........... 712/225 |
| 2005/0050303 | A1 | * | 3/2005 | Rosner et al. ............... 712/218 |

* cited by examiner

*Primary Examiner*—Christopher B Shin
(74) *Attorney, Agent, or Firm*—Oblon, Spivak, McClelland, Maier & Neustadt, P.C.

(57) ABSTRACT

An informational-signal-processing apparatus has a plurality of functional blocks and a control block that controls operations of the functional blocks. Each of the functional blocks performs a series of items of processing. The control block or a predetermined block among the control block and the functional blocks distributes a global command. Each of the functional blocks receives the global command and operates adaptively based on the received global command. The functional blocks output a block-to-block synchronizing signal at an output timing of a processed informational signal that has been performed on the basis of the global command.

10 Claims, 17 Drawing Sheets

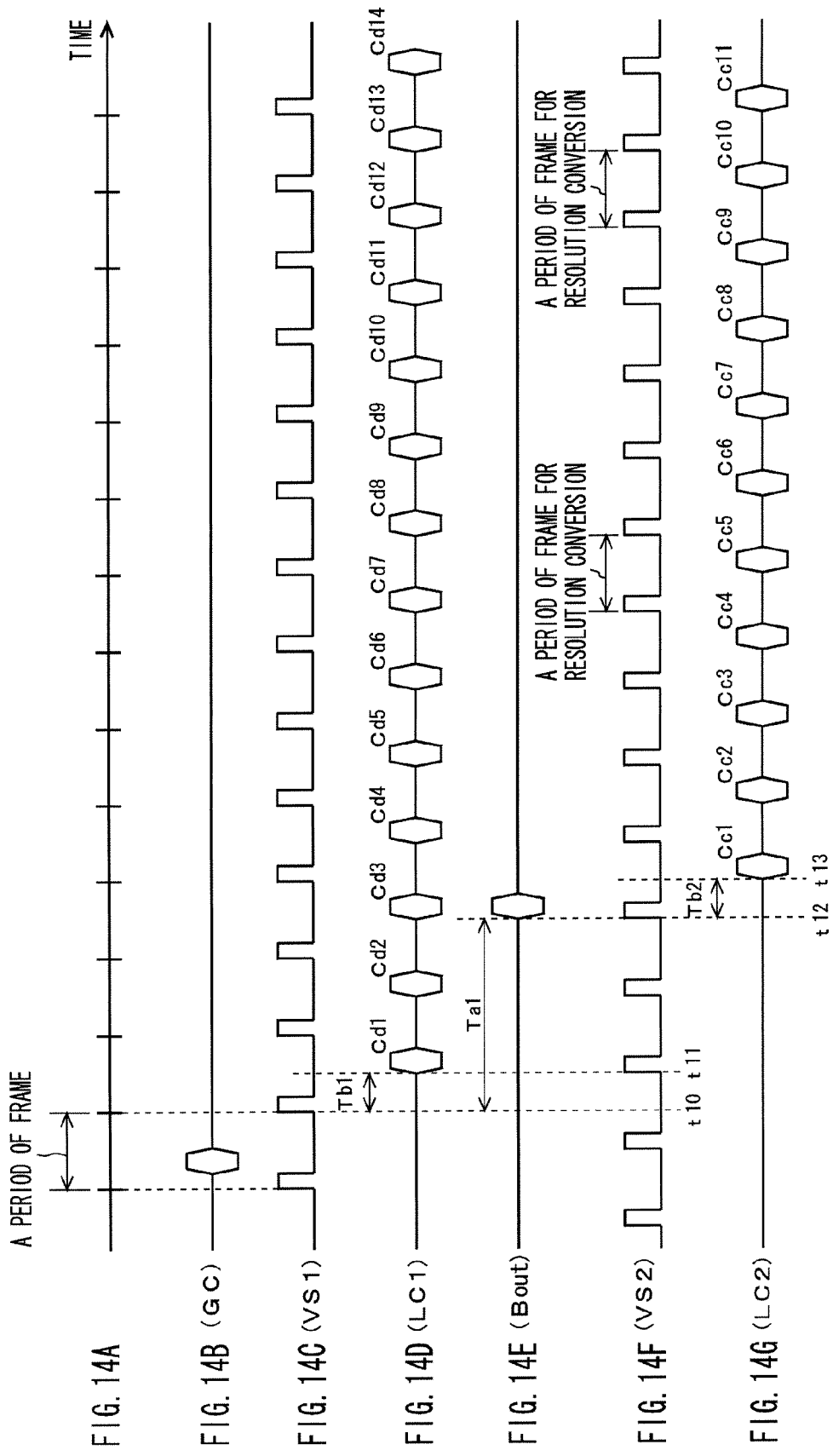

FIG. 15

| Cd1 | MOTION ADAPTATION PROCESSING |
|---|---|
| Cd2 | MOTION ADAPTATION PROCESSING |
| Cd3 | MOTION ADAPTATION PROCESSING |
| Cd4 | MOTION ADAPTATION PROCESSING |
| Cd5 | RESOLUTION CONVERSION PROCESSING |
| Cd6 | MOTION ADAPTATION PROCESSING |
| ⋮ | ⋮ |
| Cdn | ⋮ |

FIG. 16

| Cc1 | BLACK SCREEN |
|---|---|
| Cc2 | HELD |
| Cc3 | HELD |
| Cc4 | HELD |
| Cc5 | CAPTURED |
| Cc6 | HELD |
| Cc7 | HELD |
| Cc8 | HELD |
| Cc9 | HELD |
| Cc10 | CAPTURED |
| ⋮ | ⋮ |
| Ccn | ⋮ |

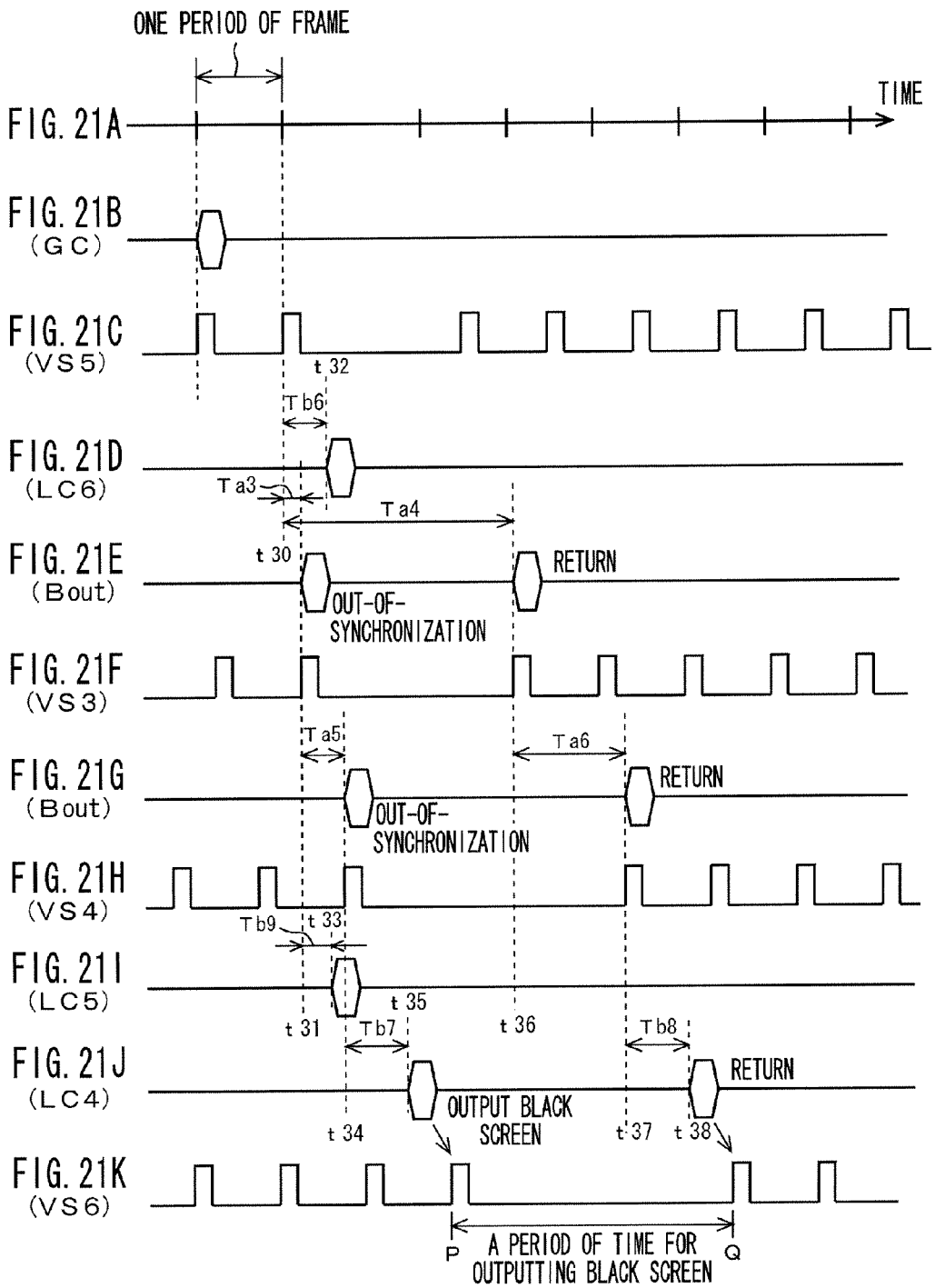

INFORMATIONAL-SIGNAL-PROCESSING APPARATUS, FUNCTIONAL BLOCK, AND METHOD OF CONTROLLING THE FUNCTIONAL BLOCK

CROSS REFERENCE TO RELATED APPLICATION

The present invention contains subject matter related to Japanese Patent Application No. JP2005-356750 filed in the Japanese Patent Office on Dec. 9, 2005, the entire contents of which being incorporated herein by reference.

BACKGROUND OF THE INVENTION

1. Field of the Invention

The present invention relates to an informational-signal-processing apparatus in which a plurality of functional blocks is used to perform a series of items of processing on an informational signal such as an image signal, a functional block using therefor, and a method for controlling the functional block.

2. Description of Related Art

A series of the items of processing such as any noise cancellations and any achievement of high image quality has been implemented by using a plurality of functional blocks such as boards, chips, and devices in an image-signal-processing apparatus by which such a series of the items of processing is performed on an image signal and then, the processed image signal is output. In this case, by inserting additional functional block into the apparatus, it has been possible to upgrade its functions. When inserting the additional functional block thereinto, acquirement of any control information for controlling the additional functional block is necessary for a control block for controlling each of the functional blocks.

Japanese Patent Application Publication No. H11-53289 has disclosed a technology such that when peripheral equipment is connected to an information-processing apparatus such as a personal computer, driver software stored in storage device of the peripheral equipment is automatically installed into storage device of the information-processing apparatus, thereby enabling the peripheral equipment to be properly controlled by the information-processing apparatus.

SUMMARY OF THE INVENTION

If a control block transmits a command (local command) in the functional block, which controls operations of the functional block directly, to the functional block when the control block controls the functional block, when a functional block is attempted to be replaced with its upgraded functional block to update its function, it is necessary for the control block to acquire any control information on the upgraded functional block, which is similar to a case where the additional functional block is inserted into the apparatus.

In this case, it is conceivable that the control block distributes a global command to the functional blocks to control them. Since, however, the global command is reached to each of the functional blocks at the same time, at all the functional blocks of interest, any reflections of control subject, for example, a processing image if an informational signal is an image signal, occur at the same time.

An informational-signal-processing apparatus that is constituted of a plurality of functional blocks has any processing delays at each of the functional blocks, so that when they are controlled if processing the same image, as compared with control to a top functional block, the control block properly controls its succeeding functional blocks later. However, the control block controls them at the same time, so that control timing of the succeeding functional blocks can be advanced from that to be controlled.

Thus, an image may be disturbed for a considerable long period of time until all the reflections relative to the global command are terminated. In some image-processing units, if they are controlled under only the condition where the image is properly input, this control may be not reflected.

It is desirable to enable the global command to be reflected at the proper control timing in the functional blocks of interest in a case where the control bock distributes the global command to the functional blocks to control them.

According to an embodiment of the present invention, there is provided an informational-signal-processing apparatus having a plurality of functional blocks, each block performing a series of items of processing on an informational signal, and a control block that controls operations of the functional blocks. At least one of the functional blocks and the control block distributes a global command. Each of the functional blocks receives the global command and operates adaptively based on the received global command. The functional blocks output a block-to-block synchronizing signal at an output timing of a processed informational signal that has been performed on the basis of the global command.

According to another embodiment of the present invention, there is provided a functional block that processes an informational signal by operating adaptively based on a global command, and outputs a block-to-block synchronizing signal at an output timing of a processed informational signal that has been performed on the basis of the global command.

According to further embodiment of the present invention, there is provided a method of controlling functional block that processes an informational signal by operating adaptively based on a global command. The method includes the steps of receiving the global command, executing the received global command, and transmitting the block-to-block synchronizing signal at timing when a processed informational signal that has been performed on the basis of the global command is output.

In the embodiments of the invention, the control block controls operations of the functional blocks. For example, the control block is connected with the functional blocks through a control bus. The functional blocks perform a series of items of processing on an informational signal such as an image signal and an audio signal.

The control block or a predetermined block among the control block and the functional blocks distributes a global command. This global command is distributed to the functional blocks through, for example, the control bus. Each of the functional blocks receives the global command and operates adaptively based on the received global command. In other words, the functional block(s) relative to the global command perform(s) any controls in which the global command is reflected.

The functional blocks output a block-to-block synchronizing signal at an output timing of a processed informational signal that has been performed on the basis of the global command. In this case, the processed informational signal relates to an informational signal after any operations corresponding to the global command have been performed on an input informational signal in a case of the functional block(s) relative to the received global command. On the other hands, the processed informational signal relates to an informational signal after any operations corresponding to the global command have been performed on an input informational signal at an antecedent stage side in a case of the functional block(s) not relative to the received global command.

Each of the functional blocks has a processing unit that processes the informational signal, and a processing control unit that controls operation of the processing unit. The processing control unit includes a global command reception section that receives the global command, a reception queue that stores the global command received at the global command reception section, a command-executing section that executes the global command stored in the reception queue, a processing-delay queue that stores the block-to-block synchronizing signal that corresponds to the global signal that is executed in the command-executing section, and a block-to-block synchronizing signal transmitting section that fetches and transmits the block-to-block synchronizing signal stored in the processing-delay queue at a timing when the processing unit outputs a processed informational signal that has been performed on the basis of the global command.

Thus, according to the embodiments of the present invention, any one of the functional blocks outputs a block-to-block synchronizing signal at an output timing of the processed informational signal that has been performed on the basis of the global command, so that at a following stage side thereof, the functional block(s) relative to the global command can execute the global command at an accurate control timing based on the this block-to-block synchronizing signal.

The functional block unless it is not a first functional block that performs operation on the basis of the global command can perform operation based on the global command on an informational signal output from a functional block of an antecedent stage after receiving the block-to-block synchronizing signal from the functional block of the antecedent stage.

Further, each of the functional blocks further can have a block-to-block synchronizing signal reception section that receives the block-to-block synchronizing signal output from a functional block of an antecedent stage. The command-executing section executes the global command stored in the reception queue when the block-to-block synchronizing signal reception section receives the block-to-block synchronizing signal.

According to the above embodiments of the invention, the functional blocks that process an informational signal by operating adaptively based on a global command output a block-to-block synchronizing signal at an output timing of a processed informational signal that has been performed on the basis of the global command, so that when the global command is distributed to the functional blocks to control them, the functional block(s) relative to the received global command can execute this global command at an accurate control timing.

The concluding portion of this specification particularly points out and directly claims the subject matter of the present invention. However those skills in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 14A through 14G are timing charts for explaining control operations in a case where a system control unit distributes the global command to command a resolution conversion;

FIG. 15 is a table for showing contents of each of the local commands that a DRC control unit sends to the DRC unit;

FIG. 16 is a table for showing contents of each of the local commands that a capture control unit sends to a capture unit;

FIGS. 21A through 21K are timing charts for explaining control operations in a case where system control unit distributes the global command to command the image conversion.

DESCRIPTION OF THE PREFERRED EMBODIMENTS

Figure 1:
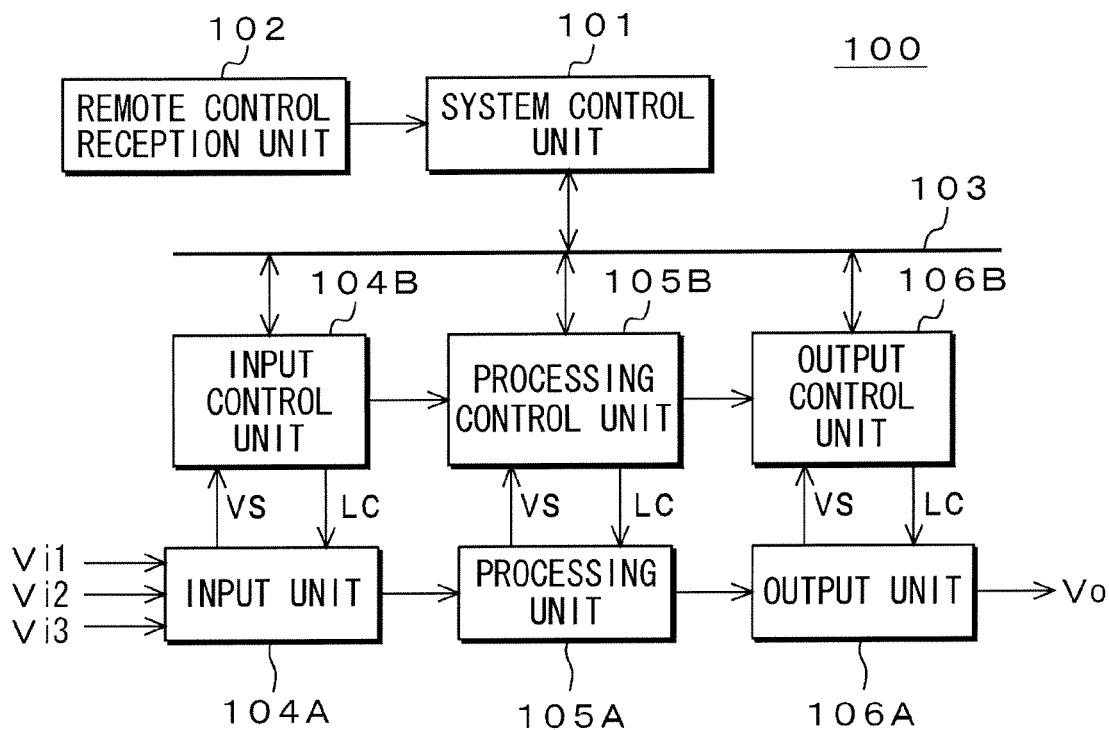
FIG. 1 is a block diagram for illustrating a configuration of an image-signal-processing apparatus according to an embodiment of the invention.

The following will describe embodiments of the invention with reference to the accompanying drawings. FIG. 1 shows a configuration of image-signal-processing apparatus 100 according to an embodiment of the invention.

The image-signal-processing apparatus 100 is equipped with, for example, a micro computer and a system control unit 101 for controlling operations of the entire apparatus. To this system control unit 101, a remote control reception unit 102 is connected. This remote control reception unit 102 receives a remote control signal such as an infrared remote control signal from a remote control transmitter, not shown, which is manipulated by a user, and transmits an operation signal corresponding to this remote control signal to the system control unit 101. This system control unit 101 constitutes a control block and is connected with a control bus.

The image-signal-processing apparatus 100 also has an input unit 104A, an input control unit 104B, a processing unit 105A, a processing control unit 105B, an output unit 106A, and an output control unit 106B. Each of the input control unit 104B, the processing control unit 105B, and the output control unit 106B is connected to the control bus 103.

The input unit 104A constitutes a processing unit for capturing an image signal specified by the user from the plural input image signals, in a case of this embodiment, three image signals, Vi1, Vi2, and Vi3, and outputting it. The input control unit 104B constitutes processing-control unit for controlling operations of the input unit 104A.

The processing unit 105A performs a predetermined processing other than input and output processing, for example, resolution conversion (pixel number conversion), noise cancellation, and the like. The processing control unit 105B controls operations of the processing unit 105A.

The output unit 106A constitutes the processing unit for receiving an image signal output from the processing unit 105A and performing any processing on it to output the processed one as an output image signal Vo. The output control unit 106B constitutes the processing-control unit for controlling operations of the output unit 106A.

It is to be noted that the input unit 104A and the input control unit 104B constitute a functional block for performing any input processing; the processing unit 105A and the processing control unit 105B constitute a functional block for performing predetermined processing; and the output unit 106A and the output control unit 106B constitute a functional block for performing any output processing.

Figure 2:
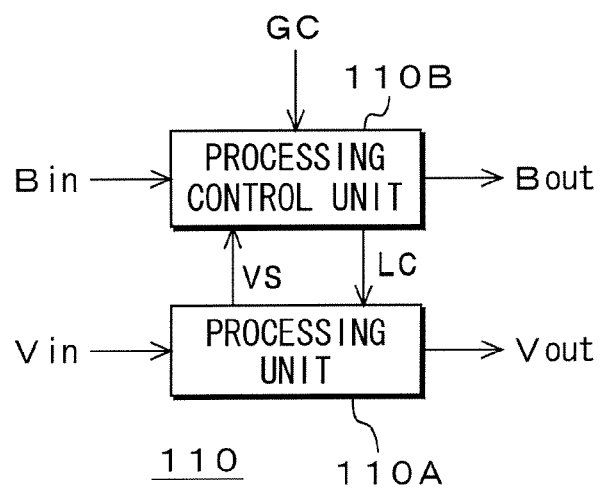
FIG. 2 is a block diagram for illustrating a basic configuration of a functional block.

FIG. 2 illustrates a basic configuration of each of the functional blocks 110 in this embodiment. Each of these functional blocks 110 has a processing unit 110A for processing an image signal and a processing control unit 110B for controlling operations of this processing unit 110A.

The processing unit 110A receives an image signal Vin from a functional block of an antecedent stage and transmits an image signal Vout to a functional block of a following stage. This processing unit 110A supplies vertical synchronization signal VS, for example, field or frame synchronization signal, that is synchronized with the image signal Vin to the processing control unit 110B.

The processing control unit 110B receives a global command GC through the control bus 103 (see FIG. 1) and supplies to the processing unit 110A a local command LC corresponding to the global command. It is to be noted that if the functional block 110 does not relate to the global command GC, the processing control unit 110B supplies to the processing unit 110A no local command LC. The global command relates to a command for performing a multicasting control and may be also referred to as "broadcasting typed command". The system control unit 101 and a predetermined functional block distribute this global command GC.

The processing control unit 110B also receives a block-to-block synchronizing signal Bin from a functional block of an antecedent stage and transmits a block-to-block synchronizing signal Bout to a functional block of a following stage. It is to be noted that the block-to-block synchronizing signals Bin and Bout relate to, for example, pieces of information relative to number data for being capable of identifying the corresponding global command GC, informational data that indicates special meaning or the like.

When any processing is performed in the functional block of antecedent stage based on the global command GC, the block-to-block synchronizing signal Bin is transmitted from the functional block of antecedent stage at timing when the processed image signal is output as an image signal Vin. Thus, when no processing is performed in the functional block of antecedent stage based on the global command, this the block-to-block synchronizing signal Bin is not input into the processing control unit 110B.

When any processing is performed in the functional block of antecedent stage or of interest based on the global command GC, the block-to-block synchronizing signal Bout is transmitted from the functional block of interest as an image signal Vout at timing when the processed image signal is output.

Figure 3:
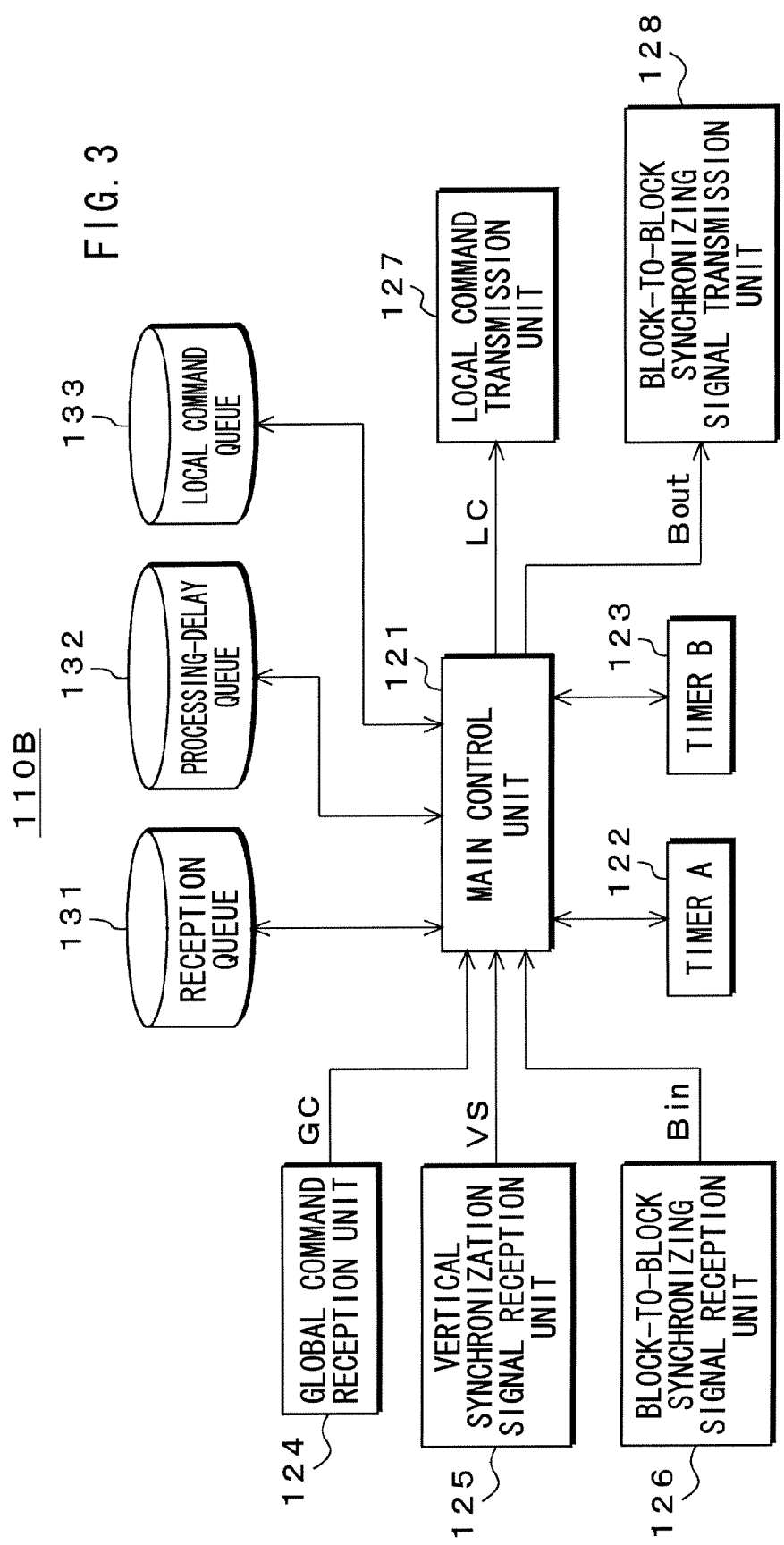
FIG. 3 is a block diagram for illustrating a configuration of a processing control unit.

FIG. 3 illustrates a configuration of the processing control unit 110B. This processing control unit 110B has main control unit 121. To this main control unit 121, a timer A 122 and timer B 123 are connected. The timer A 122 is used for adjusting output timing of a block-to-block synchronizing signal Bout to be supplied to a functional block of the following stage. The timer B 123 is used for adjusting control timing of the processing unit 110A. These timers 122, 123 are connected to the main control unit 121.

The processing control unit also has a global command reception unit 124 for receiving a global command, a vertical synchronization signal reception unit 125 for receiving a vertical synchronization signal, a block-to-block synchronizing signal reception unit 126 for receiving a block-to-block synchronizing signal, a local command transmission unit 127 for transmitting a local command, a block-to-block synchronizing signal transmission unit 126 for transmitting a block-to-block synchronizing signal, a reception queue 131, a processing-delay queue 132, and a local command queue 133.

The global command reception unit 124 receives the global command GC through the control bus 103 and supplies the global command GC to the main control unit 121. The main control unit 121 controls the reception queue 131 to store the global command GC in the reception queue 131.

The vertical synchronization signal reception unit 125 receives the vertical synchronization signal VS from the processing unit 110A (see FIG. 2) and supplies this vertical synchronization signal VS to the main control unit 121. The block-to-block synchronizing signal reception unit 126 receives the block-to-block synchronizing signal Bin from any functional block of antecedent stage and supplies this block-to-block synchronizing signal Bin to the main control unit 121.

The main control unit 121 controls the timers 122, 123 to start when receiving the vertical synchronization signal VS corresponding to the supply of block-to-block synchronizing signal Bin relative to the global command GC after the global command has been supplied.

When the block-to-block synchronizing signal Bin relative to the global command GC has been supplied, the main control unit 121 also executes the global command stored in the reception queue 131, controls the processing-delay queue 132 to store any block-to-block synchronizing signal (including items of data for numbers, informational data and the like) corresponding to the global command thus executed and being capable of indicating this global command GC or indicating a specified meaning.

The main control unit 121 further generates local command LC for controlling the processing unit 110A by executing the global command GC and supplies this local command LC to the local command queue 133.

When the global command being executed does not relate to the functional block of interest, the processing unit 110A is not controlled by this execution of the global command. In this case, the main control unit 121 does not generate any local command LC and store it in the local command queue 133.

When no functional block of antecedent stage side performs any processing based on the global command GC stored in the reception queue 131, as described above, and the functional block of interest is a first functional block relative to the global command, the processing control unit 110B receives no block-to-block synchronizing signal Bin. In this case, the main control unit 121 controls the timers 122, 123 to start and executes the global command when receiving a first vertical synchronization signal VS after the global command GC has been stored in the reception queue 131.

Based on the timer B 123, the main control unit 121 controls the local command queue 133 to read a local command LC out thereof at a control timing of the processing unit 110A and supply it to the local command transmission unit 127. The processing unit 110A operates based on this local command LC.

Based on the timer A 122, the main control unit 121 controls the processing-delay queue 132 to read the block-to-block synchronizing signal out thereof at a timing when the block-to-block synchronizing signal is transmitted to any functional block of the following stage, namely, when processing based on the global command GC has been performed on the image signal Vout output from the processing unit 110A, and to supply it to the block-to-block synchronizing signal transmission unit 128. The block-to-block synchronizing signal transmission unit 128 transmits the block-to-block synchronizing signal to any functional block of the following stage as the block-to-block synchronizing signal Bout.

Figure 4:
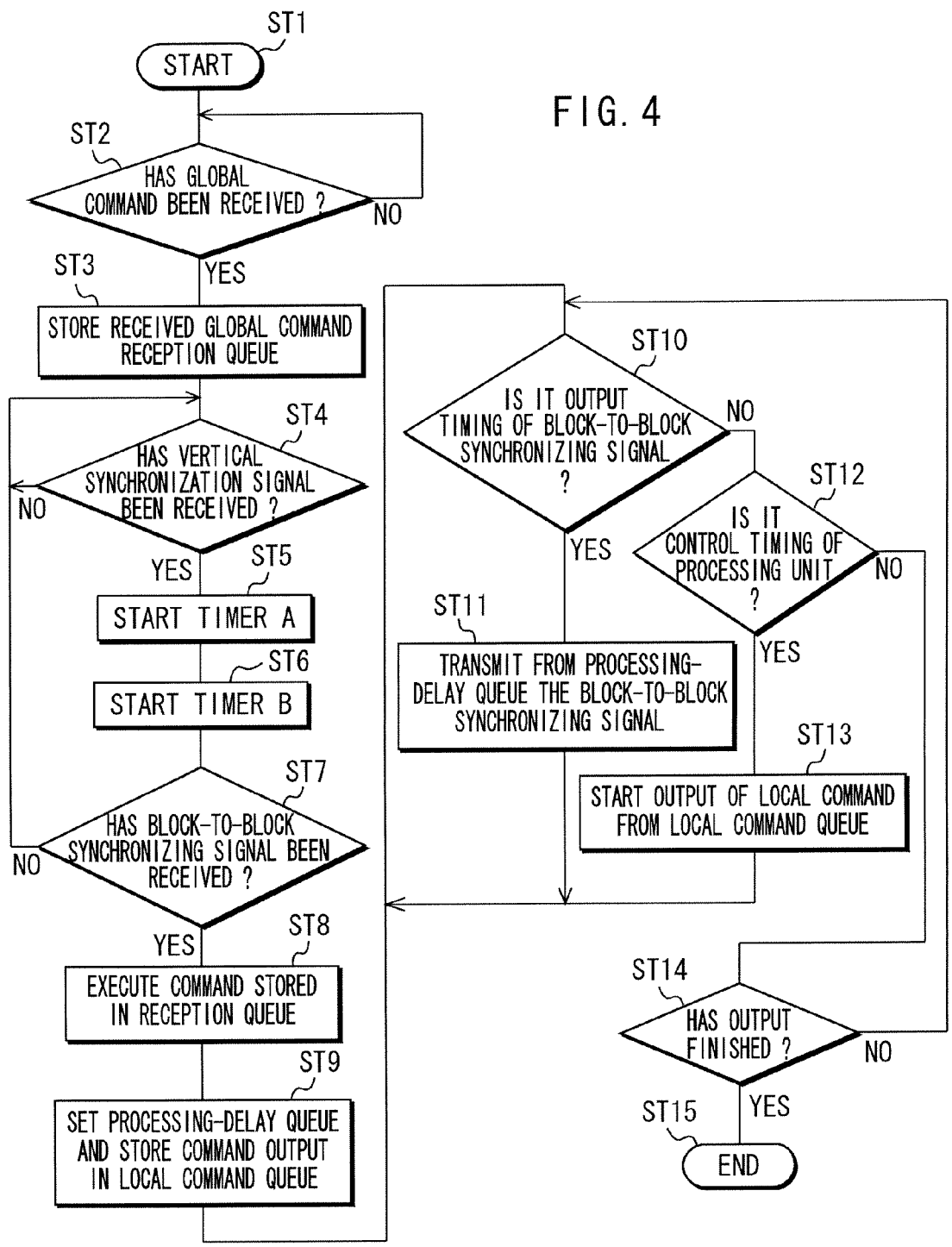
FIG. 4 is a flowchart for showing control operations of the processing control unit when any operations have been executed based on the global command at an antecedent stage side and the functional block of antecedent stage distributes the block-to-block synchronizing signal.

The following will describe operations of the processing control unit 110B shown in FIG. 3 (control operations of the main control unit 121) in a case where any functional block of the antecedent stage performs processing based on the global command and transmits the block-to-block synchronizing signal Bin to the processing control unit 110B with reference to a flowchart of FIG. 4.

First, at step ST1, control operation starts by means of turning power on. At step ST2, it is then determined whether a global command GC relative to a functional block of interest has been received. If the global command GC has been received, the reception queue 131 stores the received global command GC at step ST3.

At step ST4, it is determined whether a vertical synchronization signal VS has been received. If the vertical synchronization signal VS has been received, the timer A 122 starts at step ST5 and the timer B 123 starts at step ST6.

At step ST7, it is determined whether a block-to-block synchronizing signal Bin has been received. If no block-to-block synchronizing signal Bin has been received, the operation goes back to the step ST4 where it is again determined whether a vertical synchronization signal VS has been received. On the other hand, if the vertical synchronization signal VS corresponding to the block-to-block synchronizing signal Bin has been received at the step ST4 and the block-to-block synchronizing signal Bin has been received, the operation goes to step ST8.

At this step ST8, the global command stored in the reception queue 131 is executed. At step ST9, the processing-delay queue 132 is set. Namely, the processing-delay queue 132 stores the block-to-block synchronizing signal that corresponds to the global command to be executed and is capable of specifying this global command GC or indicates specified meaning.

At the step ST9, a local command LC that controls the processing unit 110A is also generated by executing the global command, and the local command queue 133 stores the local command LC. It is to be noted that if the functional block of interest does not relate to the global command GC to be executed in the step ST8, such processing that generates the local command LC and stores this local command LC in the local command queue 133 is not performed.

At step ST10, based on the timer A 122, whether it is timing for transmitting the block-to-block synchronizing signal to any functional block of the following stage (i.e., whether it stays during a period of time Ta) is determined. If it is this timing, a block-to-block synchronizing signal Bout is read out of the processing-delay queue 132 and is transmitted to a functional block of the following stage, at step ST11. The operation then goes back to the step ST10.

If it is not the timing for transmitting the block-to-block synchronizing signal at the step ST10, whether it is control timing of the processing unit 110A (i.e., whether it stays during a period of time Tb) is determined at step ST12. If it is control timing of the processing unit 110A, the operation goes to step ST13 where the operation starts reading the local command LC out of the local command queue 133 and transmitting the read local command LC to the processing unit 110A. The operation then goes back to step ST10. It is to be noted that if the functional block of interest does not relate to the global command GC to be executed in the step ST8, items of processing of the steps ST12 and ST13 are not performed.

If it is not control timing of the processing unit 110A at the step ST12, it is determined whether outputs of the block-to-block synchronizing signal and the local command have been finished at step ST14. If not finished, the operation goes back to the step ST10. On the other hand, if finished, the control operation accompanied with the reception of global command GC is finished at step ST15.

Figure 5:
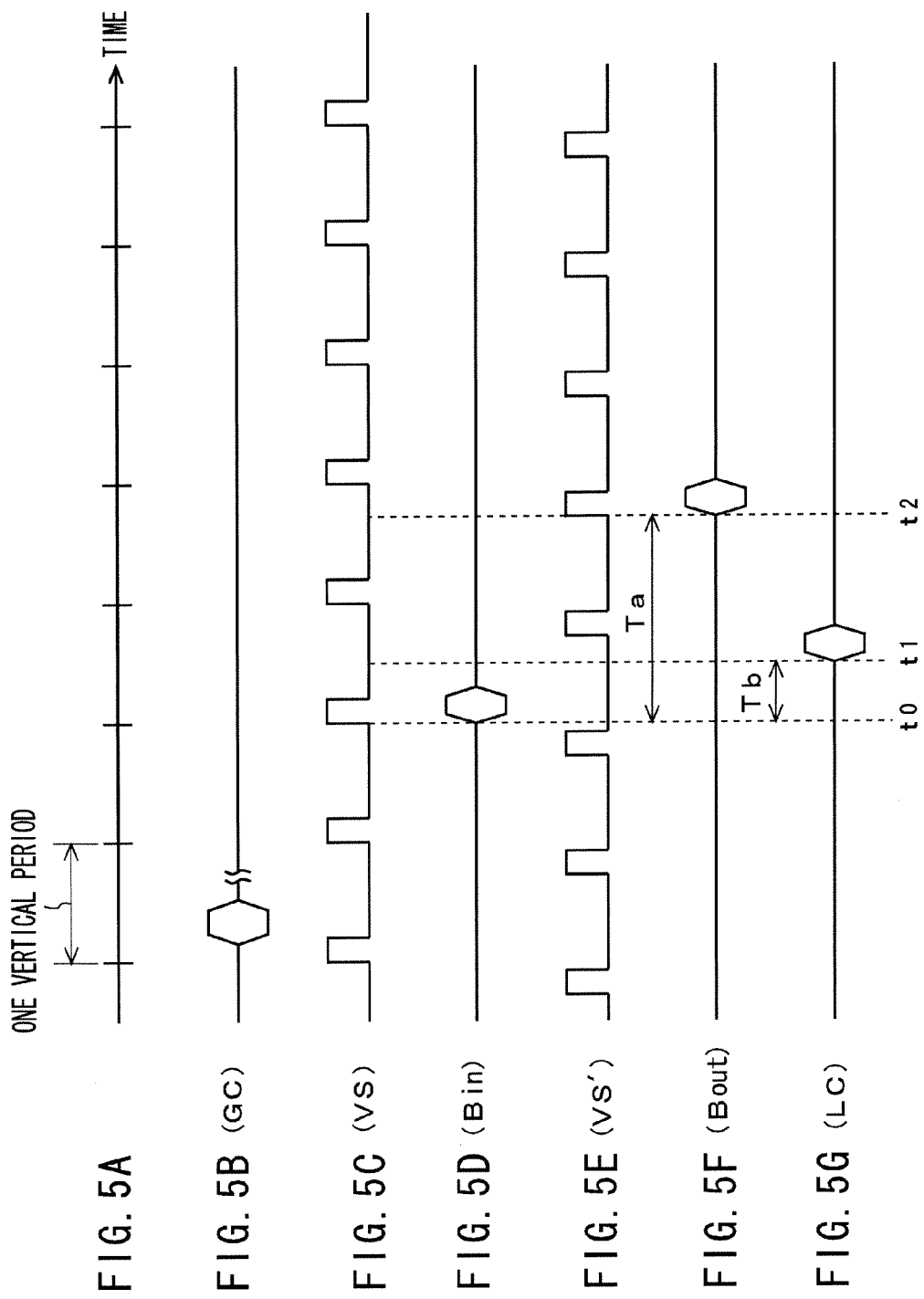
FIGS. 5A through 5G are a diagram for showing a timing chart of control operations of the processing control section.

The following will describe operations of the processing control unit 110B shown in FIG. 3 (control operations of the main control unit 121) with reference to a timing chart of FIG. 5.

FIG. 5A shows vertical periods. The global command GC is received during a predetermined vertical period and stored in the reception queue 131 as shown in FIG. 5B. FIG. 5C shows the vertical synchronization signal VS that is synchronized with the input image signal Vin and with which the processing unit 110A supplies the processing control unit 110B.

As shown in FIG. 5D, the block-to-block synchronizing signal Bin is received at a timing to of a predetermined one of the vertical synchronization signal VS with which the processing unit 110A supplies the processing control unit 110B.

When receiving this block-to-block synchronizing signal Bin, the timer A 122 and the timer B 123 start to cause the global command stored in the reception queue 131 to be executed. The processing-delay queue 132 then stores the block-to-block synchronizing signal that corresponds to this global command GC. The local command queue 133 also stores the local command LC generated by executing the global command GC.

As shown in FIG. 5G, at a point of time t1 when time Tb has been elapsed, this is, at a control timing of the processing unit 110A, the local command LC is read out of the local command queue 133 and transmitted to the processing unit 110A. As shown in FIG. 5F, at a point of time t2 when a period of time Ta has been elapsed, this is, at a timing of transmitting the block-to-block synchronizing signal to any functional block of the following stage, the block-to-block synchronizing signal Bout is read out of the processing-delay queue 132 and transmitted to the functional block of the following stage.

The timing of transmitting the block-to-block synchronizing signal Bout to any functional block of the following stage relates to a point of time when an image signal starts being output as an image signal Vout output from the processing unit 110A after processing based on the global command GC has been performed, as described above. FIG. 5E shows the vertical synchronization signal VS' that is synchronized with the image signal Vout output from the processing unit 110A.

It is to be noted that if the functional block of interest is not concerned with the received global command GC shown in FIG. 5B, no local command LC shown in FIG. 5G is output.

Figure 6:
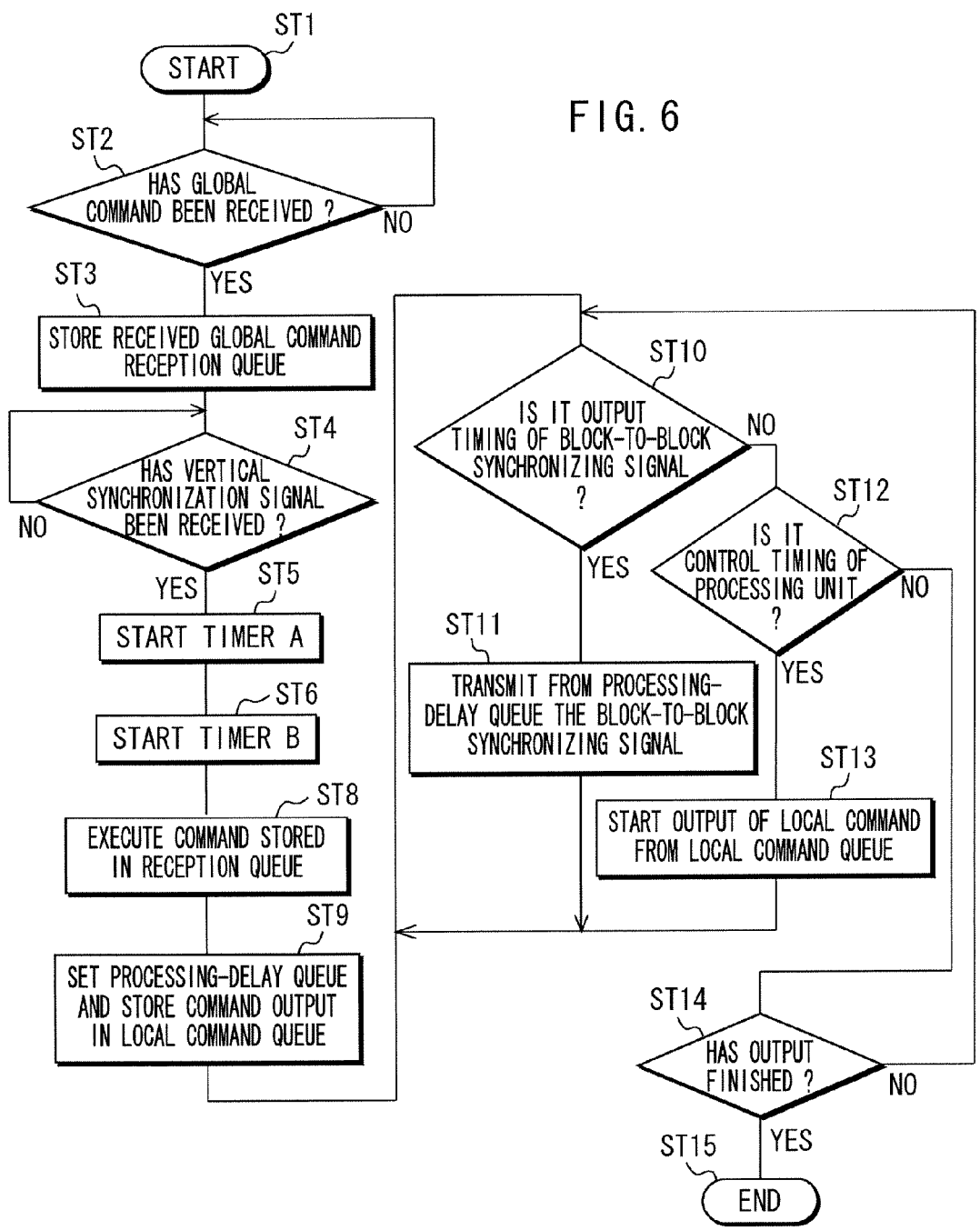
FIG. 6 is a flowchart for showing control operations of the processing control section when any operations have not been executed based on the global command at an antecedent stage side and the functional block of antecedent stage distributes no block-to-block synchronizing signal if the corresponding functional block is a first functional block relative to the global command.

The following will describe operations of the processing control unit 110B shown in FIG. 3 (control operations of the main control unit 121) with reference to a flowchart of FIG. 6, if no processing based on the global command GC is performed in the functional block of antecedent stage and no block-to-block synchronizing signal Bin is received from the functional block of antecedent stage while the functional block of interest is a first functional block relative to the global command GC. Like reference numbers of FIG. 4 refer to like elements of FIG. 6.

The flowchart shown in FIG. 6 is the same as that shown in FIG. 4 except for deletion of the step ST7 therefrom. In this case, after the vertical synchronization signal VS has been received at step ST4 and the timer A 122 and the timer B 123 have started, the global command GC stored in the reception queue 131 is directly executed. Remaining operations thereof are similar to those of the flowchart shown in FIG. 4.

It is to be noted that if no processing based on the global command GC is performed in the functional block of antecedent stage, no block-to-block synchronizing signal Bin is received from the functional block of antecedent stage, and the functional block of interest is not concerned with the global command GC, the processing-delay queue 132 does not store the block-to-block synchronizing signal even by executing the global command GC so that it does not transmit the block-to-block synchronizing signal Bout.

The following will describe operations of the image-signal-processing apparatus 100 shown in FIG. 1. Three image signals Vi1, Vi2, Vi3 are input to the input unit 104A. In the input unit 104A, an image signal specified by a user is taken out of the three image signals Vi1, Vi2, Vi3. The image signal taken in the input unit 104A is supplied to the processing unit 105A. The processing unit 105A performs a predetermined processing such as resolution conversion and noise cancellation on the image signal received from the input unit 104A. The image signal processed in the processing unit 105A is supplied to the output unit 106A from which it is output as an output image signal Vo.

According to the image-signal-processing apparatus 100 shown in FIG. 1, if processing based on the global command GC is performed in functional block of antecedent stage relative to each of the functional blocks or functional block of interest, the block-to-block synchronizing signal corresponding to the global command GC is output at a timing when the image signal Vout that is processed on the basis of the global command GC is output. Thus, if plural functional blocks are concerned with the predetermined global command GC, in the functional block of following stage, based on this block-to-block synchronizing signal, this predetermined global command GC can be reflected at a proper control timing.

Therefore, it is excellently possible to do the following:

(1) the processing unit 105A processes and outputs an image signal for every some frames based on the global command GC and the output unit 106A captures and outputs this processed image signal for every some frames;

(2) the processing unit 105A converts a value of the parameter in resolution axis/noise axis when performing number-of-pixels conversion, based on the global command GC, and the output unit 106A displays on OSD this parameter value corresponding to the process frame in which the parameter is changed; and (3) an image signal to be taken out thereof in the input unit 104A is changed on the basis of the global command GC and the output unit 106A performs blanking in order to avoid disturbance in the image caused by the change of the image signal.

In each of the functional blocks, a period of time Ta (see FIG. 5) starting from input of the block-to-block synchronizing signal Bin to output of the block-to-block synchronizing signal Bout is set in accordance with any processing delay in their functional block, so that the block-to-block synchronizing signal Bout can be output at timing when the image signal Vout that is processed on the basis of the global command GC is output.

Figure 7:
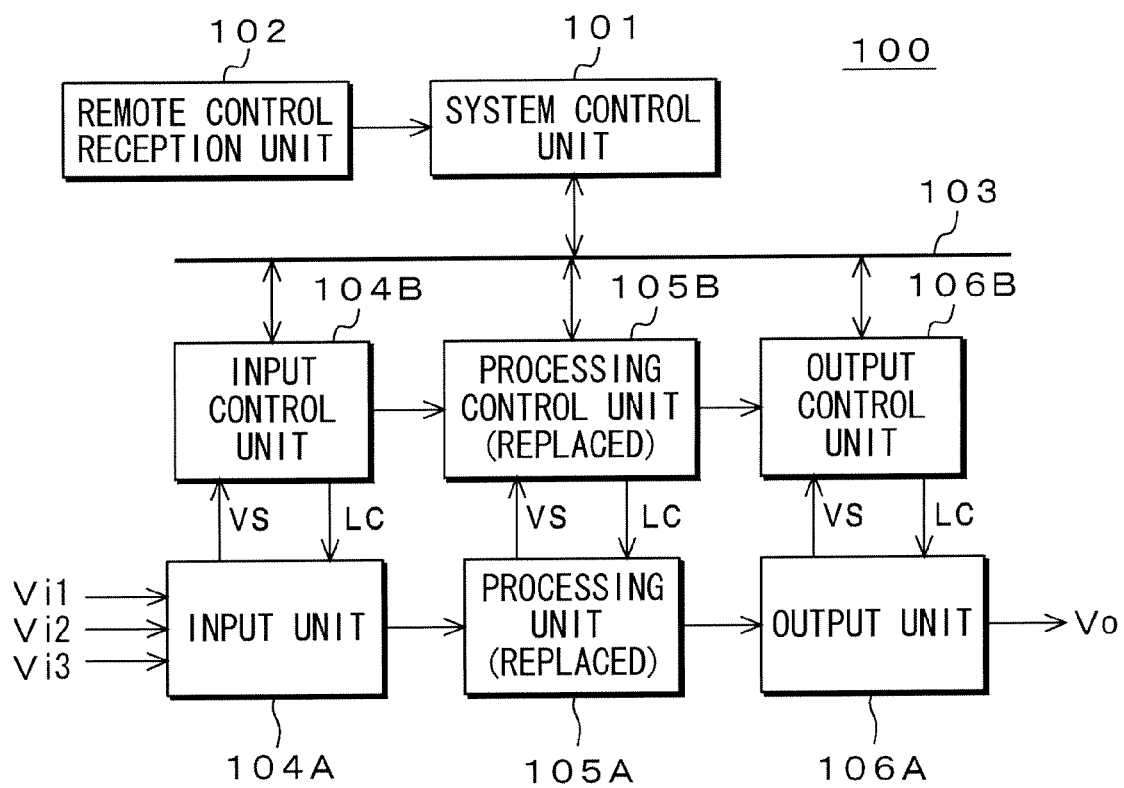
FIG. 7 is a block diagram for illustrating a configuration of an image-signal-processing apparatus when exchanging the functional blocks to explain any efficacy thereof.
Figure 8:
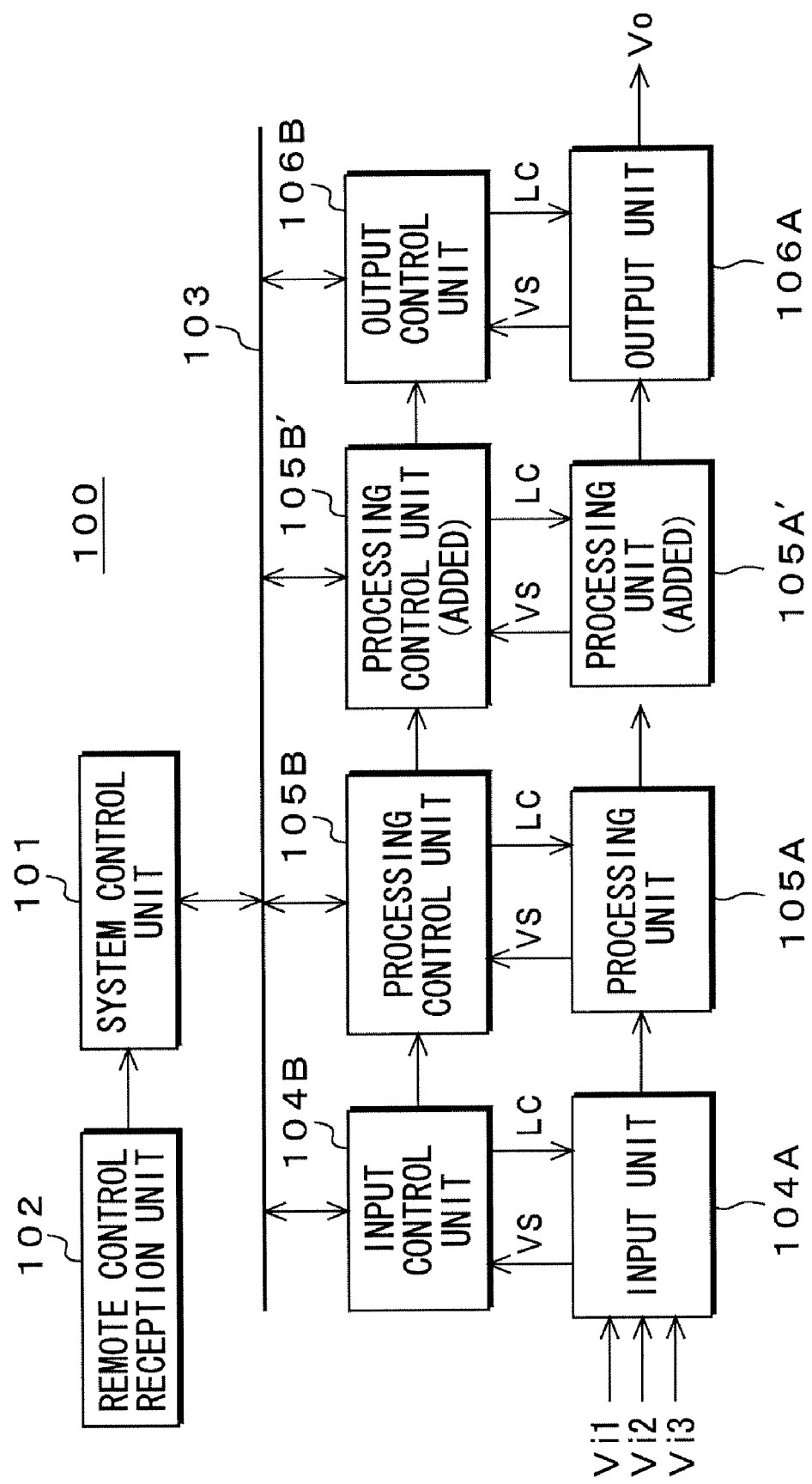
FIG. 8 is a block diagram for illustrating a configuration of an image-signal-processing apparatus when adding a functional block thereto to explain any efficacy thereof.

Thus, even if functional blocks (the processing unit 105A and the processing control unit 105B) are replaced by their upgrading as shown in FIG. 7 or even if functional blocks (the processing unit 105A' and the processing control unit 105B') are added as shown in FIG. 8, timing of the block-to-block synchronizing signal received in the functional block of following stage is changed but its timing relationship with the image signal remain unchanged. This allows the global command GC and any other items to be made unchanged.

Figure 9:
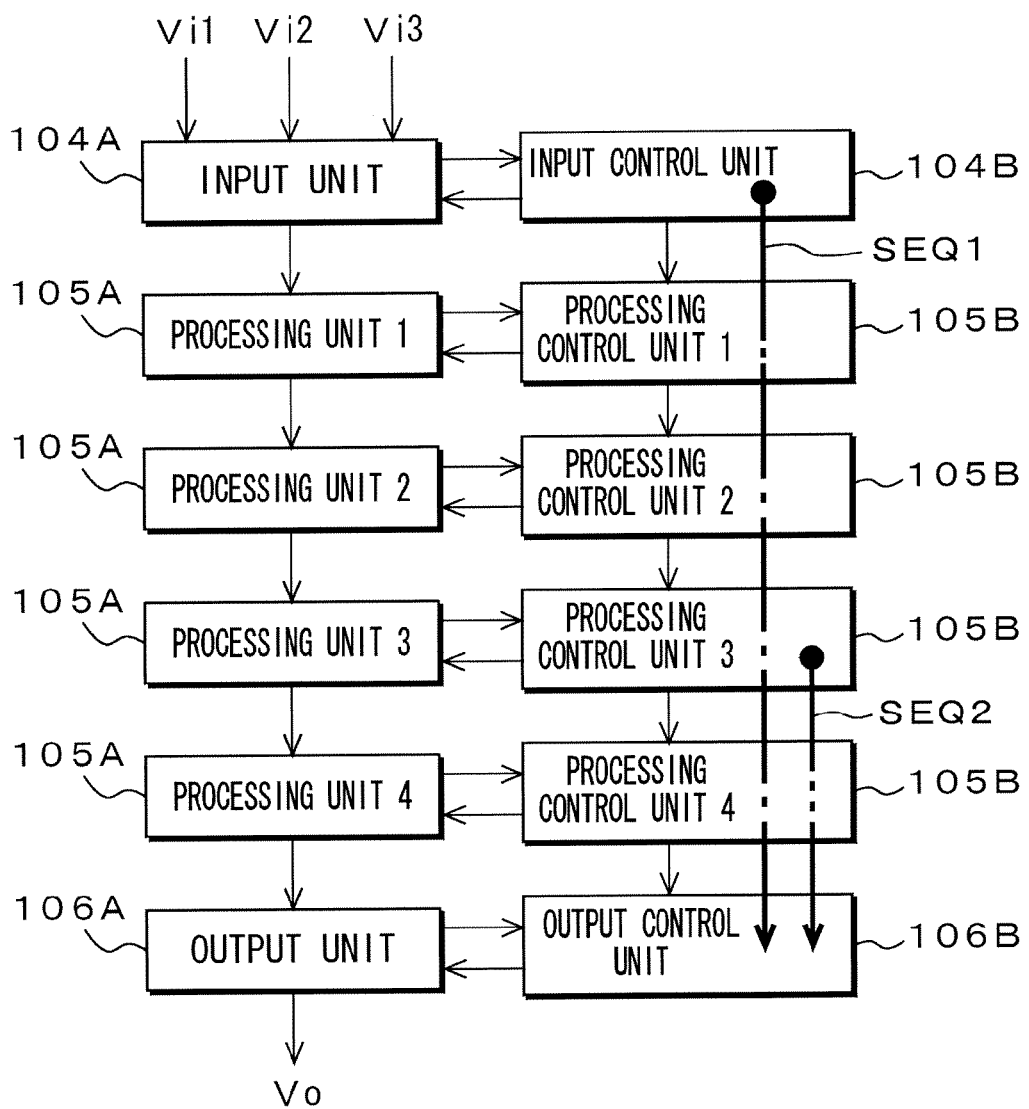
FIG. 9 is a diagram for explaining a concomitance of a plurality of control sequences.

Although a control sequence relative to a predetermined global command GC using the above block-to-block synchronizing signal has been used in one apparatus in the above embodiment, plural control sequences relative to different global commands GC can be used in parallel as shown in FIG. 9 (see two control sequences SEQ1, SEQ2 shown in FIG. 9). In this case, by m providing each of the global commands GC with any information such as items of data on identification number to each of the global commands GC or items of data on indication of specified meaning, it is possible to identify correspondence of each of the global commands GC and the block-to-block synchronizing signal. This allows each of the global commands GC to be reflected in each of the functional blocks of interest at their proper timing.

Next, a specified example of operations will be described.

First, an example will be described in which using an image-signal-processing apparatus 100A shown in FIG. 10, digital reality creation (DRC) unit performs any resolution conversion on an image signal for each some frames based on the global command GC and outputs it to a capture unit and the capture unit captures and outputs the processed image signal for each some frames.

Figure 10:
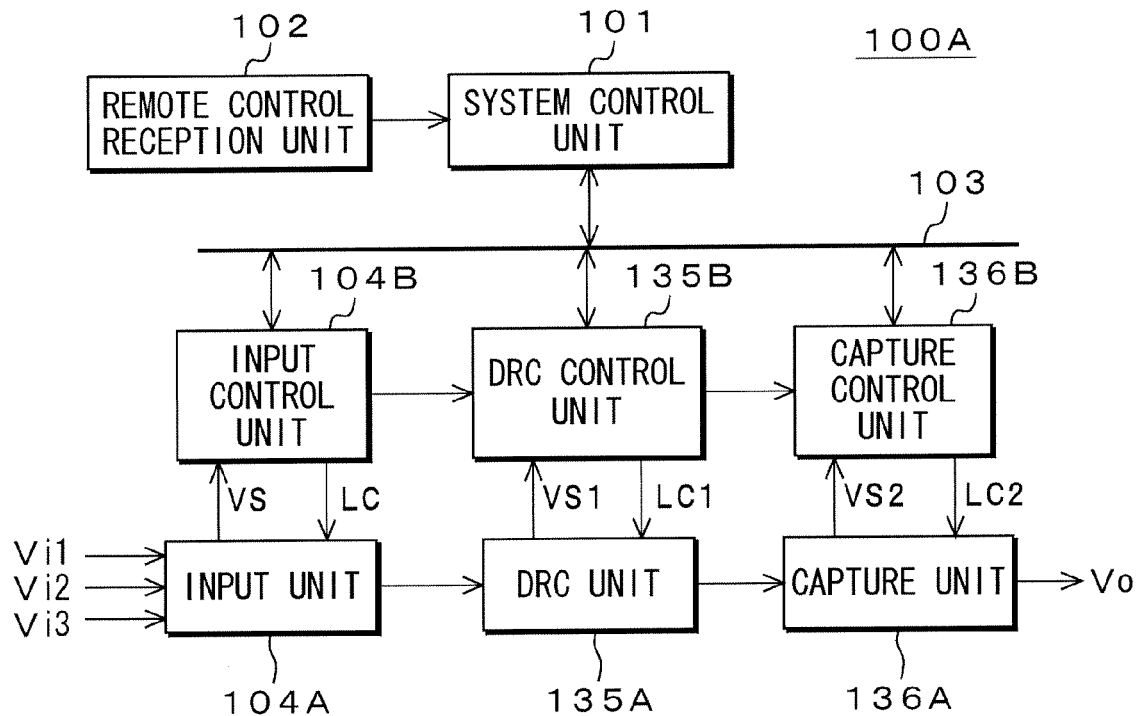
FIG. 10 is a block diagram for illustrating a configuration of an image-signal-processing apparatus according to another embodiment of the invention by which an image signal processed in DRC unit for each several frames is output based on the global command and the image signal thus processed for each several frames is captured by the capture unit to output it.

FIG. 10 shows a configuration of the image-signal-processing apparatus 100A. In FIG. 10, like reference characters refer to like elements in FIG. 1, detailed explanation of which will be omitted. The image-signal-processing apparatus 100A has a DRC unit 135A and a DRC control unit 135B in place of the processing unit 105A and the processing control unit 105B, shown in FIG. 1, as well as a capture unit 136A and a capture control unit 136B in place of the output unit 106A and the output control unit 106B.

The DRC unit 135A performs resolution conversion processing on an image signal for each five frames based on the global command GC indicative to the resolution conversion to output it. It is to be noted that the resolution conversion relates to any processing of increase in number of pixels. For example, processing is illustrated such that a standard definition (SD) signal is converted to a high definition (HD) signal. The DRC control unit 135B controls operations of the DRC unit 135A. This DRC control unit 135B has the same configuration as that of the above-mentioned processing control unit 110B (see FIG. 3).

Figure 11:
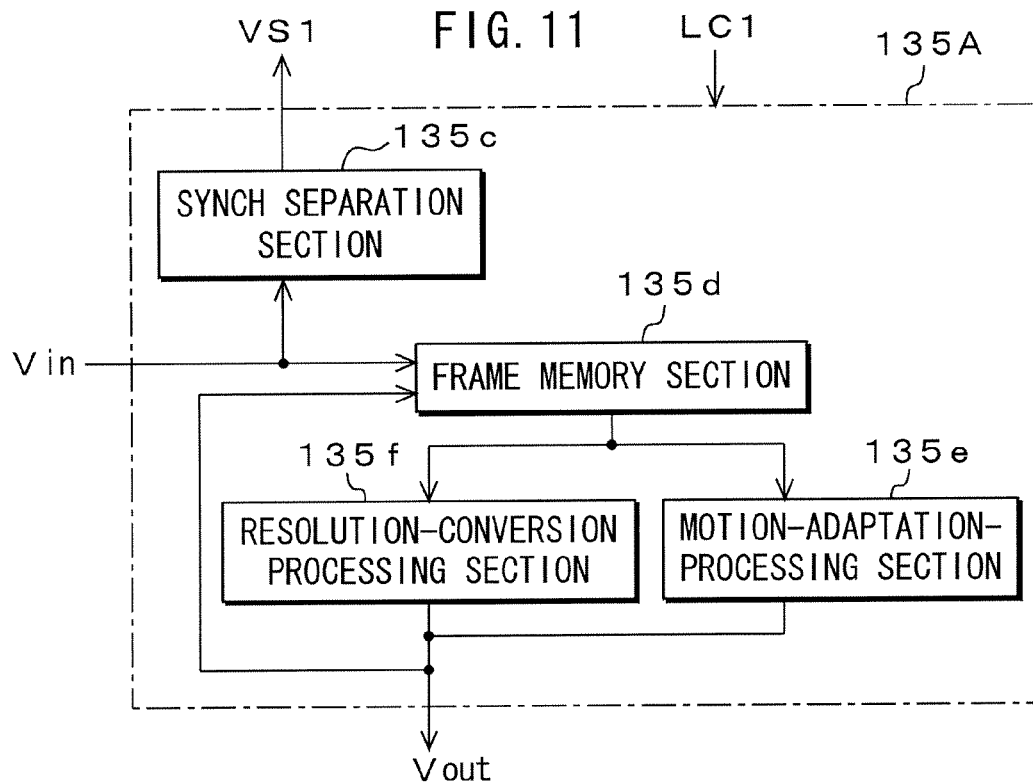
FIG. 11 is a block diagram for illustrating a configuration of the DRC unit.

FIG. 11 shows a configuration of DRC unit 135A. This DRC unit 135A has a synch separation section 135c, a frame memory section 135d, a motion-adaptation-processing section 135e and a resolution-conversion-processing section 135f.

The synch separation section 135c separates a frame synchronization signal VS1 from the input image signal Vin and outputs it. The frame memory section 135d temporarily stores the input image signal Vin and an image signal of each frame that is obtained by performing in the motion-adaptation-processing section 135e.

The motion-adaptation-processing section 135e adds motion-compensated antecedent frame to a current frame, thereby generating a processing frames. These processing frames are stored in the frame memory section 135d. The resolution-conversion-processing section 135f performs resolution conversion processing on the image signal for each five frames by using four processing frames generated by the above-mentioned motion-adaptation-processing section 135e during the antecedent five frames and generates processing frames. These processing frames are output as an output image signal Vout.

It is to be noted that the DRC unit 135A outputs the input image signal Vin as it is through the frame memory section 135d and the motion-adaptation-processing section 135e as the output image signal Vout in an ordinary mode where any resolution conversion is not performed.

The capture unit 136A stores in their capture memory the processing frames on which the DRC unit 135A performs resolution conversion processing based on the global command GC indicative of the resolution conversion and which are output from the DRC unit 135A, and outputs the processing frames repeatedly until next processing frame has been obtained. The capture control unit 136B controls operations of the capture unit 136A. This capture control unit 136B has the same configuration as that of the above-mentioned processing control unit 110B (see FIG. 3).

Figure 12:
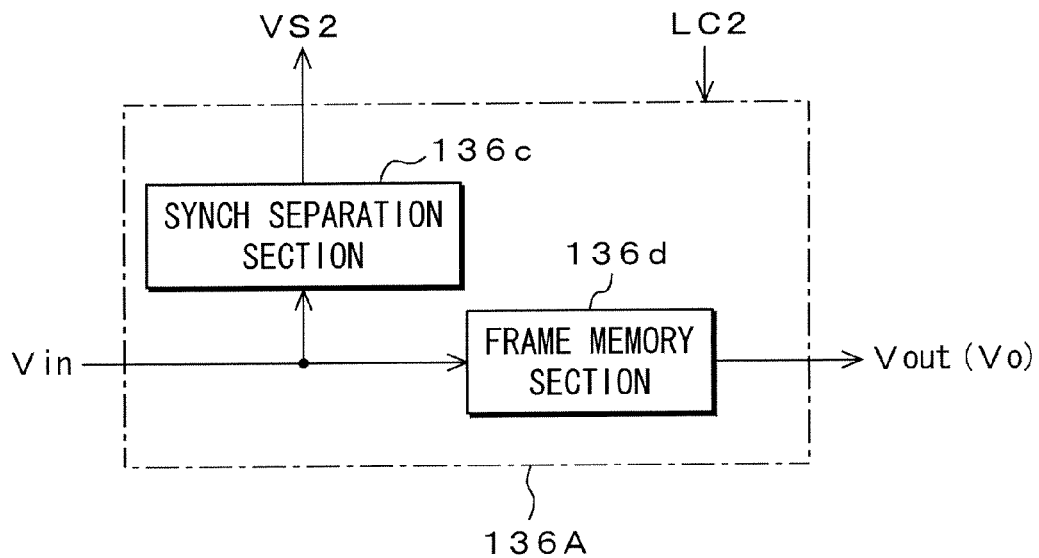
FIG. 12 is a block diagram for illustrating a configuration of the capture unit.

FIG. 12 shows a configuration of the capture unit 136A. This capture unit 136A has a synch separation section 136c and a frame memory section 136d. The synch separation section 136c separates a frame synchronization signal VS2 from the input image signal Vin and outputs it. The frame memory section 136d captures the processing frame in which resolution conversion is performed on the input image signal Vin for each five frames and holds the processing frame until next processing frame is captured. The frame memory section 136d outputs the held processing frame in which resolution conversion is performed repeatedly as output image signal Vout (Vo).

Figure 13A:
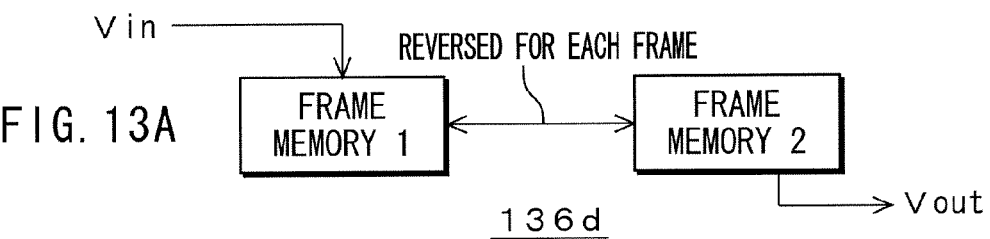
FIGS. 13A and 13B are diagrams for explaining a configuration of memory in a frame memory.
Figure 13B:
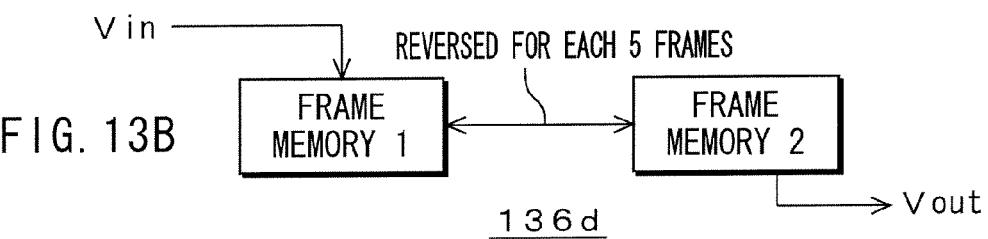

The frame memory section 136d has a frame memory 1 and a frame memory 2. During a period of five frames, as shown in FIG. 13B, the processing frames resolution-converted and stored in the frame memory 2 during a period of former five frames are repeatedly read out of the frame memory 2 and output as well as a new processing frame is resolution-converted and stored in the frame memory 1 during a period of last one frame of the five frames. At a period of next five frames, a relationship between the frame memories 1 and 2 is reversed.

The capture unit 136A outputs the input image signal Vin as it is through the frame memory section 136d as the output image signal Vout at an ordinary mode in which the DRC unit 135A does not perform the resolution conversion. In this case, during a period of frame, as shown in FIG. 13A, the processing frame resolution-converted and stored in the frame memory 2 during a preceding period of frame is read out of the frame memory 2 and output as well as a processing frame is resolution-converted and stored in the frame memory 1 during a period of the current frame. At a period of next frame, a relationship between the frame memories 1 and 2 is reversed.

The following will describe operations of the image-signal-processing apparatus 100A shown in FIG. 10 if the image-signal-processing apparatus 100A receives the global command GC indicative to the resolution conversion from the system control unit 101, with respect to a control timing chart shown in FIGS. 14A through 14G.

FIG. 14A shows each period of frame. As shown in FIG. 14B, the system control unit 101 transmits a global command GC indicative to the resolution conversion at a predetermined period of frame. FIG. 14C shows a frame synchronization signal VS1 that is synchronized with the input image signal Vin received by the DRC unit 135A. The DRC unit 135A supplies the frame synchronization signal VS1 to the DRC control unit 135B.

The DRC control unit 135B starts its timer at a timing t10 of the frame synchronization signal VS1 that is supplied from the DRC unit 135A to the DRC control unit 135B after the system control unit 101 has transmitted the global command GC and the reception queue 131 has stored the global command GC. The DRC control unit 135B also executes the global command stored in the reception queue 131, stores the block-to-block synchronizing signal corresponding to this global command in the processing-delay queue 132, and stores the local command LC1 generated by executing the global command GC in the local command queue 133.

As shown in FIG. 14D, the DRC control unit 135B then starts reading the local command LC1 out of the local command queue 133 at a point of time t11 when time Tb1 has been elapsed therefrom, this is, at a control timing of the DRC unit 135A, and transmits it to the DRC unit 135A. In this case, local commands Cd1, Cd2, Cd3 . . . are supplied sequentially one-by-one for each period of frame to the DRC unit 135A with them being synchronized with the frame synchronization signal VS1.

FIG. 15 shows contents of the local commands, Cd1, Cd2, Cd3 . . . , Cdn. Cd1, Cd2, Cd3, and Cd4 are local commands each for performing the motion adaptation processing and they generate four processing frames on which the motion adaptation processing is performed. Cd5 is a local command for performing the resolution conversion processing and it generates one processing frame on which the resolution conversion processing is performed by using the four processing frames on which the motion adaptation processing is performed. The following Cd6, Cd7 . . . , Cdn are local commands for repeatedly performing the same processing as the above Cd1 through Cd5.

As shown in FIG. 14E, the DRC control unit 135B then starts reading the block-to-block synchronizing signal Bout out of the processing-delay queue 132 at a point of time t12 when time Ta1 has been elapsed therefrom, this is, at a timing when the block-to-block synchronizing signal is transmitted to the functional block of following stage, and transmits it to the capture control unit 136B. This point of time t12 is a point of start time when a first processing frame on which the motion adaptation is performed is output from the DRC unit 135A. FIG. 14F shows frame synchronization signal VS2 that is synchronized with the image signal Vin input to the capture unit 136A. The frame synchronization signal VS2 is supplied from the capture unit 136A to the capture control unit 136B.

The capture control unit 136B also stores the global command GC that is issued from the above-mentioned system control unit 101 in its reception queue 131. The capture control unit 136B then starts its timer at a timing t12 when it receives the block-to-block synchronizing signal Bin (corresponding to the block-to-block synchronizing signal Bout shown in FIG. 14E) from the above-mentioned DRC control unit 135B and executes the global command stored in the reception queue 131 to store the local command LC2 obtained by the execution thereof in the local command queue 133.

As shown in FIG. 14G, the capture control unit 136B further starts reading the local command LC2 out of the local command queue 133 at a point of time t13 when time Tb2 has been elapsed therefrom, this is, at a control timing of the capture unit 136A, and transmits it to the capture unit 136A. In this case, local commands Cc1, Cc2, Cc3 . . . , Ccn are supplied sequentially one-by-one for each period of frame to the capture unit 136A with them being synchronized with the frame synchronization signal VS2.

FIG. 16 shows contents of the local commands, Cc1, Cc2, Cc3 . . . , Ccn. Cc1 is a local command for outputting black screen. Cc2 through Cc4 and Cc6 through Cc9 are local commands each for holding their states. Cc5 and Cc10 are local commands each for outputting a screen by the processing frame that is stored during a preceding period of frame and is resolution-converted.

Thus, during periods of frames when respective local commands, Cc2 through Cc5 are supplied, image signal Vout relative to the black screen repeatedly read out of one frame memory, for example, the frame memory 1 and output. During these periods of frames, the processing frames output from the DRC unit 135A are sequentially written and stored in the other frame memory, for example, the frame memory 2. The resolution-converted processing frames are stored therein at an end of these periods of frames.

During periods of frames when respective local commands, Cc6 through Cc10 are supplied, the resolution-converted processing frames are repeatedly read out of the other frame memory and output as the output image signal Vout. During these periods of frames, the processing frames output from the DRC unit 135A are sequentially written and stored in one frame memory. New processing frames are that is resolution-converted are stored therein. The following Cc11, Cc12 . . . , Ccn are local commands for repeatedly performing the same processing as the above Cc6 through Cc10.

Thus, according to the image-signal-processing apparatus 110A, when generating the global command GC indicative to the resolution conversion, DRC unit 135A executes this global command GC to perform the motion adaptation of four frames and the resolution conversion of one frame using the result of the motion adaptation repeatedly and output the processed result thereof as the output image signal Vout which is supplied to the capture unit 136A. At a timing when a processing frame on which the motion adaptation is first performed is output from the DRC unit 135A, the block-to-block synchronizing signal Bout is output from the DRC control unit 135B and supplied to the capture control unit 136B.

The capture unit 136A is controlled by the capture control unit 136B according to a timing based on the block-to-block synchronizing signal. Namely, in the capture unit 136A, the processing frames, received from the DRC unit 135A, on which the resolution conversion is performed for each five frames are surely taken into the frame memories and output as the output image signal Vout (Vo). This allows the processing frames on which the resolution conversion is performed for each five frames to be surely captured and output continuously.

Figure 17:
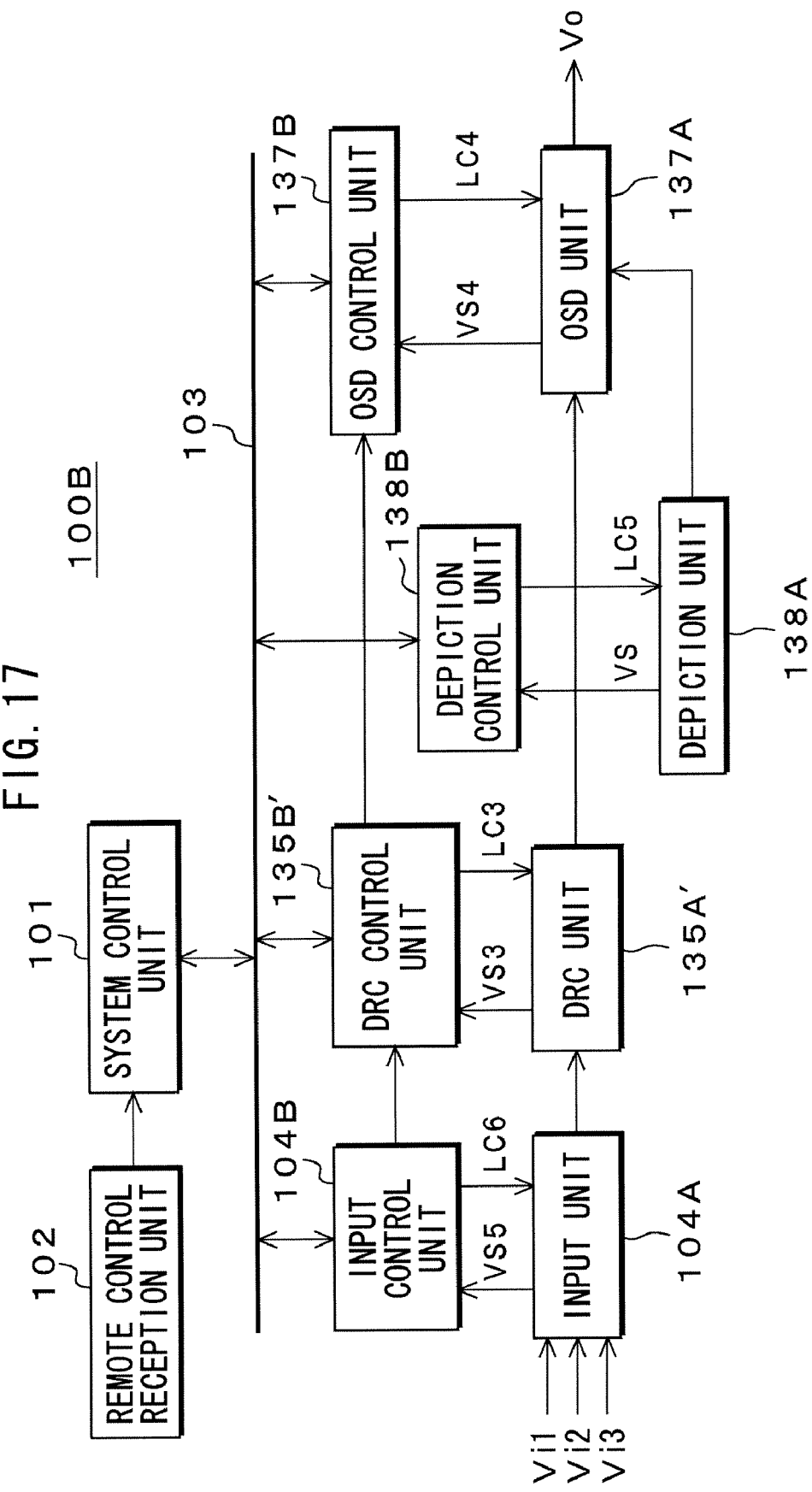
FIG. 17 is a block diagram for illustrating a configuration of an image-signal-processing apparatus according to further embodiment of the invention in which DRC unit changes parameter values of resolution axis/noise axis when performing conversion processing on the number of pixels based on the global command and an OSD unit displays these parameters on an OSD screen corresponding to any process frames of which its changed parameter value of the parameters.

The following will describe an example in which a DRC unit changes parameter values in resolution axis/noise axis when the number-of-pixels conversion is performed based on the global command GC and an on screen display (OSD) unit displays these parameter values on the OSD with respect to the processing frame of which the parameter value is changed, by using an image-signal-processing apparatus 100B shown in FIG. 17.

First, a configuration of the image-signal-processing apparatus 100B shown in FIG. 17 will be described. In this FIG. 17, like reference numbers refer to like elements of FIG. 1, detailed explanation of which will be omitted. The image-signal-processing apparatus 100B has the DRC unit 135A' and a DRC control unit 135B' in place of the processing unit 105A and the processing control unit 105B of 1 as well as the OSD unit 137A and an OSD control unit 137B in place of the output unit 106A and the output control unit 106B of FIG. 1. The image-signal-processing apparatus 100B also has a depiction unit 138A and a depiction control unit 138B as a new functional block.

The RDC unit 135A' performs number-of-pixels conversion and calculates a signal relative to each pixel constituting an image signal to be output by an estimation equation using coefficient data corresponding to parameter values in resolution axis/noise axis based on the global command GC indicative to the parameter values. The DRC control unit 135B' controls operations of the DRC unit 135A'. This DRC control unit 135B' has the same configuration as that of the above-mentioned processing control unit 110B (see FIG. 3).

The depiction unit (graphic unit) 138A generates character (s) and picture(s) to be inserted into a screen. The depiction unit 138A also generates a display frame for displaying characters to indicate its resolution based on the global command GC indicative to the parameter values in resolution axis/noise axis. The depiction control unit 138B controls operations of the depiction unit 138A. This depiction control unit 138B has the same configuration as that of the above-mentioned processing control unit 110B (see FIG. 3).

The OSD unit 137A synthesizes the display frame generated in the depiction unit 138A to the processing frame of the DRC unit 135A', thereby displaying the character(s) and the picture(s) on OSD. This OSD unit 137A synthesizes the display frame to display the parameter values generated in the depiction unit 138A to the processing frame of the DRC unit 135A', thereby outputting it as an output image signal Vout (Vo).

Figure 18:
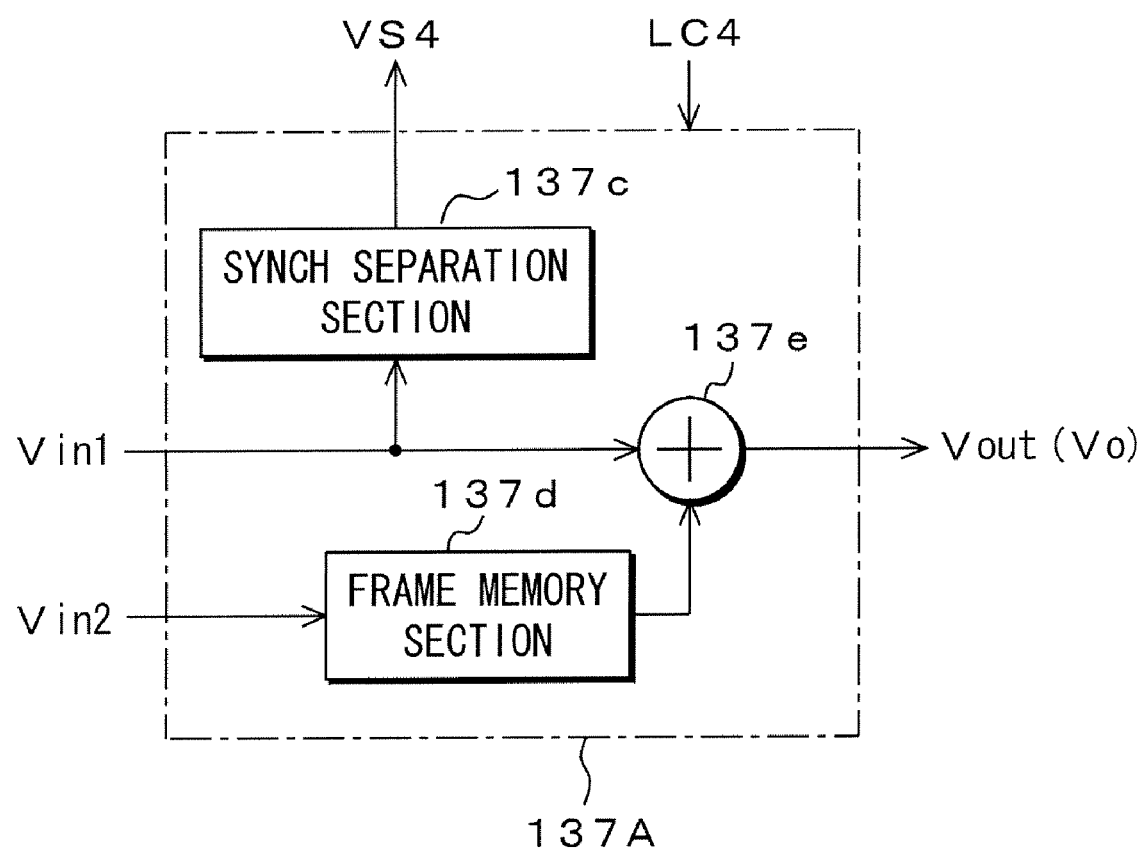
FIG. 18 is a diagram for illustrating a configuration of the OSD unit.

FIG. 18 shows a configuration of the OSD unit 137A. This OSD unit 137A has a synch separation section 137c, a frame memory section 137d, and a synthesis section 137e. The synch separation section 137c separates a frame synchronization signal VS4 from the processing frame Vin1 that is an image signal received from the DRC unit 135A' and outputs it. The frame memory section 137d stores a display frame Vin2 generated in the depiction unit 138A. The synthesis section 137e stores the processing frame Vin1 received from the DRC unit 135A' in its frame memory, not shown, and synthesizes the display frame Vin2 stored in the frame memory section 137d to the processing frame Vin stored in the above frame memory, not shown, during a preceding period of frame, thereby outputting it as the output image signal Vout (Vo).

The following will describe operations of the image-signal-processing apparatus 100B shown in FIG. 17 if the system control unit 101 transmits the global command GC indicative to the parameter values in the resolution axis/noise axis, with respect to a control timing chart shown in FIGS. 19A through 19H.

Figure 19:
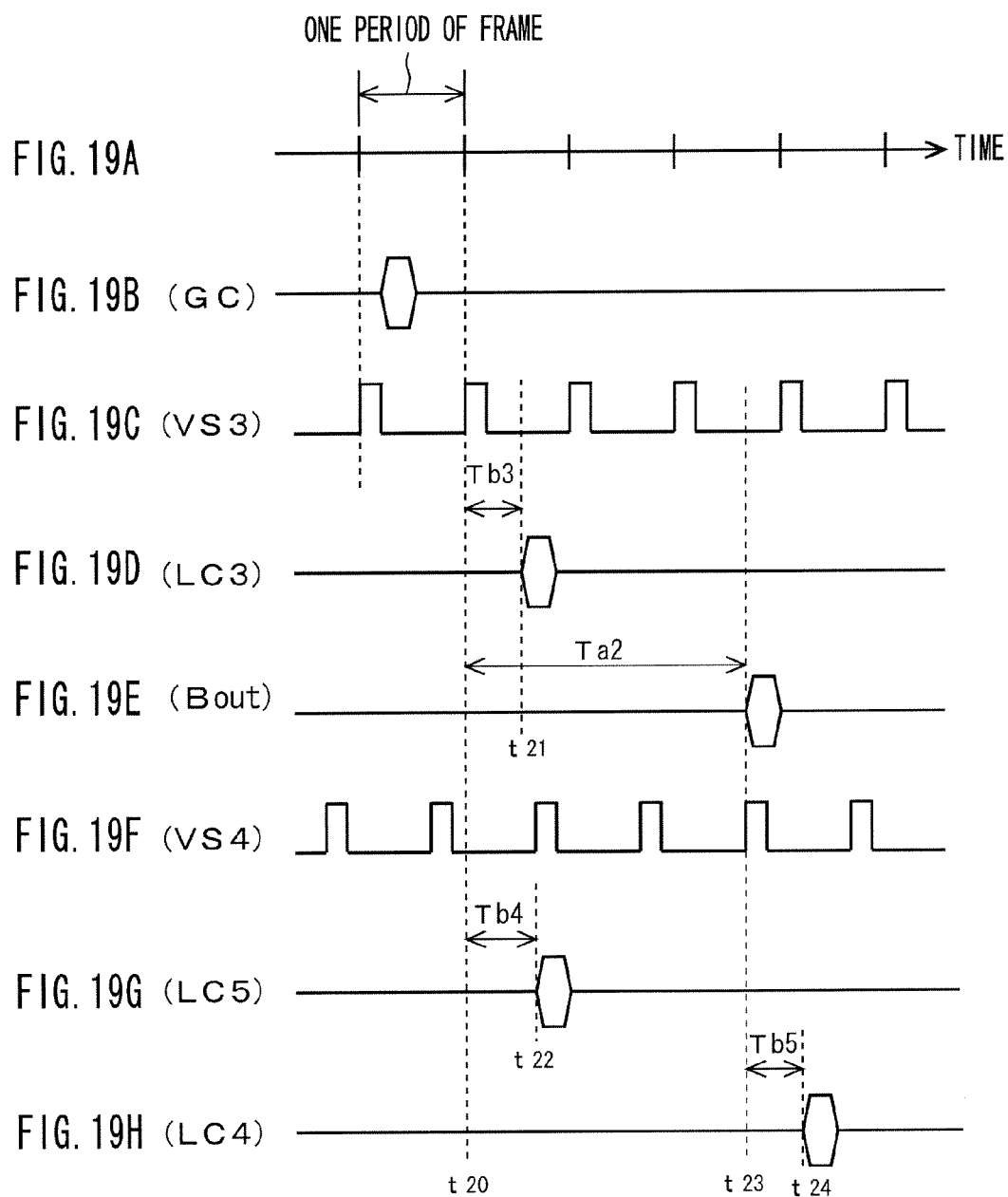
FIGS. 19A through 19H are timing charts for explaining control operations in a case where system control unit distributes the global command to command the parameter values of resolution axis/noise axis.

FIG. 19A shows each period of frame. As shown in FIG. 19B, the system control unit 101 transmits a global command GC indicative to the parameter values in the resolution axis/ noise axis. FIG. 19C shows a frame synchronization signal VS3 that is synchronized with the input image signal Vin received by the DRC unit 135A'. The DRC unit 135A' supplies the frame synchronization signal VS3 to the DRC control unit 135B'.

The DRC control unit 135B' starts its timer at a timing t20 of the frame synchronization signal VS3 that is supplied from the DRC unit 135A' to the DRC control unit 135B' after the system control unit 101 has transmitted the global command GC and the reception queue 131 has stored the global command GC. The DRC control unit 135B' also executes the global command stored in the reception queue 131, stores the block-to-block synchronizing signal corresponding to this global command in the processing-delay queue 132, and stores the local command LC3 generated by executing the global command GC in the local command queue 133.

As shown in FIG. 19D, the DRC control unit 135B' then starts reading the local command LC3 out of the local command queue 133 at a point of time t21 when time Tb3 has been elapsed therefrom, this is, at a control timing of the DRC unit 135A', and transmits it to the DRC unit 135A'. This enables the parameter values in the resolution axis/noise axis to be changed to the indicated ones in the DRC unit 135A'.

As shown in FIG. 19E, the DRC control unit 135B' then starts reading the block-to-block synchronizing signal Bout out of the processing-delay queue 132 at a point of time t23 when time Ta2 has been elapsed therefrom, this is, at a timing when the block-to-block synchronizing signal is transmitted to the functional block of following stage, and transmits it to the OSD control unit 137B. This point of time t23 is a point of start time when the DRC unit 135A' outputs a first processing frame obtained by the parameter values in the resolution axis/noise axis indicated. FIG. 19F shows frame synchronization signal VS4 that is synchronized with the image signal Vin input to the OSD unit 137A. The frame synchronization signal VS4 is supplied from the OSD unit 137A to the OSD control unit 137B.

The depiction control unit 138B stores the global command GC received from the system control unit 101 in its reception queue 131, as described above. The depiction control unit 138B then executes this global command GC immediately and, as shown in FIG. 19G, transmits the local command LC5 to the depiction unit 138A at a point of time t22 when time Tb4 has been elapsed therefrom, this is, at a control timing of the depiction unit 138A to enable this depiction unit 138A to generate the display frame for displaying the parameter values in the resolution axis/noise axis indicated. This display frame is input to the OSD unit 137A and stored in its frame memory section 137d (see FIG. 18).

The OSD control unit 137B also stores the global command GC received from the system control unit 101 in its reception queue 131, as described above. The OSD control unit 137B starts its timer at a timing t23 when the block-to-block synchronizing signal Bin (corresponding to the block-to-block synchronizing signal Bout shown in FIG. 19E) is received from the DRC control unit 135B' as described above, executes the global command GC stored in the reception queue 131, and stores the local command LC4 generated by executing the global command GC in the local command queue 133.

The OSD control unit 137B then starts reading the local command LC4 out of the local command queue 133 at a point of time t24 when time Tb5 has been elapsed therefrom, this is, at a control timing of the OSD unit 137A and transmits it to the OSD unit 137A. This enables this OSD unit 137A to synthesize the display frame for displaying the parameter values to the processing frame, which is supplied from the DRC unit 135A', generated on the basis of the parameter values in the resolution axis/noise axis indicated. This synthesized frame is then output as the output image signal Vout.

Thus, in the image-signal-processing apparatus 100B shown in FIG. 17, when distributing the global command GC indicative to the parameter values in the resolution axis/noise axis, the DRC unit 135A' executes this global command GC to perform the number-of-pixels conversion based on the indicated parameter values and outputs a result of the conversion as the output image signal Vout to the OSD unit 137A. The DRC control unit 135B' outputs the block-to-block synchronizing signal Bout to the OSD control unit 137B at a timing when a first processing frame on which the number-of-pixels conversion is performed based on the indicated parameter values is output from the DRC unit 135A'.

Based on the distribution of the global command GC indicative to the parameter values in the resolution axis/noise axis, the depiction unit 138A generates the display frame for displaying the indicated parameter values in the resolution axis/noise axis on OSD. This display frame is supplied to the OSD unit 137A and stored in its frame memory section 137d.

The OSD control unit 137B controls the OSD unit 137A at timing based on the block-to-block synchronizing signal received from the DRC control unit 135B' as described above. Namely, the OSD unit 137A synthesizes the display frame for displaying the indicated parameter values to the processing frame, supplied from the DRC unit 135A', on which the number-of-pixels conversion is performed based on the indicated parameter values. The synthesized frame is output as the output image signal Vout (Vo).

Figure 20:
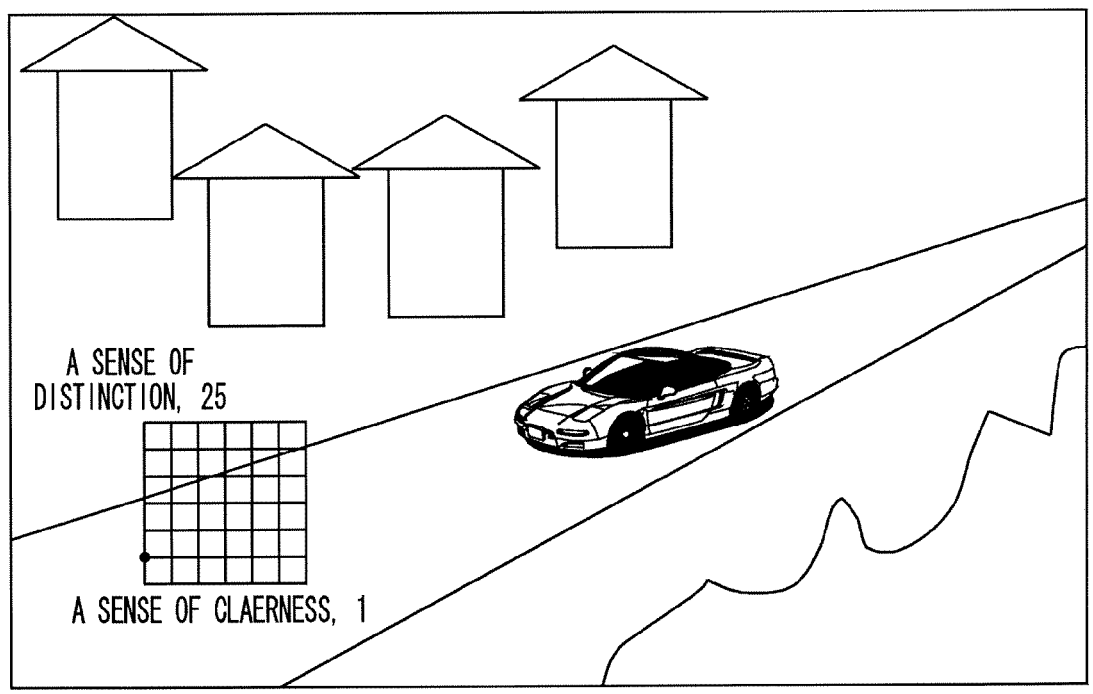
FIG. 20 is a diagram for illustrating a display example of parameter values of resolution axis/noise axis on the OSD display.

This enables alterations in an image by changing the parameter values in the resolution axis/noise axis to correspond to alterations in the OSD indication of the parameter values. FIG. 20 shows an example of OSD indication of the parameter values in the resolution axis/noise axis. An indication, "a sense of distinction, 25" indicates that a parameter value in the resolution axis has twenty-five degrees while an indication; "a sense of clearness, 1" indicates that a parameter value in the noise axis has one degree.

The following will describe operations of the image-signal-processing apparatus 100B shown in FIG. 17 if the input unit 104A changes the image signal to be taken on the basis of the global command GC and the OSD unit 137A blanks it out in order to avoid disturbance in the image caused by the change of the image signal.

FIG. 21A shows each period of frame. As shown in FIG. 21B, the system control unit 101 distributes a global command GC indicative to the change of images at a predetermined period of frame. FIG. 21C shows a frame synchronization signal VS5 that is supplied from the input unit 104A to the input control unit 104B. This frame synchronization signal VS5 is obtained by separating it from the input image signal selected in the input unit 104A. Therefore, when changing the image signals, the change causes any disturbance in the image.

The input control unit 104B stores the global command GC distributed from the system control unit 101, as described above, in its reception queue 131. The input control unit 104B starts its timer at a timing t30 of the first frame synchronization signal VS5 after the global command GC has been distributed. The input control unit 104B also executes the global command GC stored in the reception queue 131, stores the block-to-block synchronizing signal corresponding to this global command in the processing-delay queue 132, and stores the local command LC6 generated by executing the global command GC in the local command queue 133.

As shown in FIG. 21D, the input control unit 104B then starts reading the local command LC6 out of the local command queue 133 at a point of time t32 when time Tb6 has been elapsed therefrom, this is, at a control timing of the input unit 104A, and transmits it to the input unit 104A. This enables the image signals to be changed in the input unit 104A. In this case, synchronization in the image signal Vout output from the input unit 104A is disturbed.

As shown in FIG. 21E, the input control unit 104B then starts reading the block-to-block synchronizing signal indicative to out-of-synchronization out of the processing-delay queue 132 at a point of time t31 when time Ta3 has been elapsed therefrom, and reading the block-to-block synchronizing signal indicative to a return of it out of the processing-delay queue 132 at a point of time t36 when time Ta4 has been elapsed therefrom, and transmits them to the DRC control unit 135B' of following stage. This point of time t31 relates to timing corresponding to a final frame synchronization signal of the output image signal Vout before changing the images. The point of time t36 relates to timing corresponding to a first frame synchronization signal of the output image signal Vout after changing the images. FIG. 21F shows a frame synchronization signal VS3 that is synchronized with the image signal Vin input to the DRC unit 135A. The frame synchronization signal VS3 is supplied from the DRC unit 135A' to the DRC control unit 135B'.

The DRC control unit 135B' also stores the global command GC in its reception queue 131 when the global command GC has been distributed from the system control unit 101 as described above. The DRC control unit 135B' then starts its timer at a timing t31 when it receives the block-to-block synchronizing signal Bin (corresponding to the block-to-block synchronizing signal Bout shown in FIG. 21E) indicative to the out-of-synchronization from the above-mentioned input control unit 104B and stores the block-to-block synchronizing signal indicative to the out-of-synchronization.

As shown in FIG. 21G, the DRC control unit 135B' further starts reading the block-to-block synchronizing signal indicative to the out-of-synchronization out of the processing-delay queue 132 at a point of time t34 when time Ta5 has been elapsed therefrom and transmits it to the OSD control unit 137B. This point of time t34 relates to timing corresponding to a final frame synchronization signal VS4 of the output image signal Vout before changing the images.

Similarly, the DRC control unit 135B' then starts its timer at a timing t36 when it receives the block-to-block synchronizing signal Bin (corresponding to the block-to-block synchronizing signal Bout shown in FIG. 21E) indicative to the return from the above-mentioned input control unit 104B and stores the block-to-block synchronizing signal indicative to the return in the processing-delay queue 132.

As shown in FIG. 21G, the DRC control unit 135B' further starts reading the block-to-block synchronizing signal indicative to the return out of the processing-delay queue 132 at a point of time t37 when time Ta6 has been elapsed therefrom and transmits it to the OSD control unit 137B of following stage. This point of time t37 relates to timing corresponding to a first frame synchronization signal VS4 of the output image signal Vout after changing the images.

FIG. 21H shows a frame synchronization signal VS4 that is synchronized with the image signal Vin input to the OSD unit 137A. The frame synchronization signal VS4 is supplied from the OSD unit 137A to the OSD control unit 137B.

The depiction control unit 138B stores the global command GC received from the system control unit 101 in its reception queue 131, as described above. The depiction control unit 138B then executes this global command GC immediately and, as shown in FIG. 21I, transmits the local command LC5 to the depiction unit 138A at a point of time t33 when time Tb9 has been elapsed therefrom, this is, at a control timing of the depiction unit 138A to enable this depiction unit 138A to generate the display frame for displaying channel or input equipment that is available for the changed image signal. This display frame is input to the OSD unit 137A and stored in its frame memory section 137d (see FIG. 18).

The OSD control unit 137B also stores the global command GC received from the system control unit 101 in its reception queue 131, as described above. The OSD control unit 137B starts its timer at a timing t34 when the block-to-block synchronizing signal (corresponding to the first block-to-block synchronizing signal Bout shown in FIG. 21G) indicative to the out-of-synchronization is received from the DRC control unit 135B' as described above, executes the global command GC stored in the reception queue 131, and stores the local command LC4 generated by executing the global command GC in the local command queue 133. This local command LC4 is a command for outputting a black screen.

As shown in FIG. 21J, the OSD control unit 137B then starts reading the local command LC4 out of the local command queue 133 at a point of time t35 when time Tb7 has been elapsed therefrom and transmits it to the OSD unit 137A. This enables this OSD unit 137A to output an image signal Vout (Vo) for displaying the black screen from a point of time P. This point of time P relates to timing corresponding to the final frame synchronization signal VS6 of the image signal before changing the images.

Similarly, the OSD control unit 137B starts its timer at a timing t37 when the block-to-block synchronizing signal (corresponding to the second block-to-block synchronizing signal Bout shown in FIG. 21G) indicative to the return is received from the DRC control unit 135B' as described above, executes the global command GC stored in the reception queue 131, and stores the local command LC4 generated by executing the global command GC in the local command queue 133. This local command LC4 is a command for returning the black screen to a normal screen thereof.

As shown in FIG. 21J, the OSD control unit 137B then starts reading the local command LC4 out of the local command queue 133 at a point of time t38 when time Tb8 has been elapsed therefrom and transmits it to the OSD unit 137A. This enables this OSD unit 137A to output an image signal Vout (Vo) for displaying the normal screen from a point of time Q.

It is to be noted that, in this case, the OSD unit 137A synthesizes the display frame, which is generated in the depiction unit 138A, for displaying channel and/or input equipment that is available for the changed image signal to the processing frame from the DRC unit 135A'. The synthesized frame is output as the output image signal Vout (Vo).

The point of time Q relates to timing corresponding to the first frame synchronization signal VS6 of the image signal after changing the images. FIG. 21K shows the frame synchronization signal VS6 that is synchronized with the image signal Vout (Vo) output from the OSD unit 137A.

Thus, in the image-signal-processing apparatus 100B shown in FIG. 17, when distributing the global command GC indicative to the change of image signals, the input unit 104A changes the image signals and the input control unit 104B outputs the block-to-block synchronizing signal Bout indicative to the out-of-synchronization corresponding to the final frame synchronization signal of the image signal before changing the image signals and then outputs the block-to-block synchronizing signal Bout indicative to the return corresponding to the first frame synchronization signal of the image signal after changing the image signals. These block-to-block synchronizing signals are transmitted to the OSD control unit 137B through the DRC control unit 135B'.

The controls of the OSD unit 137A by the OSD control unit 137B are performed at timing based on the above-mentioned block-to-block synchronizing signals Bout indicative to the out-of-synchronization and the return. From the OSD unit 137A, an image signal Vout (Vo) is output only for a period of the out-of-synchronization time from the final frame synchronization signal of the image signal before changing the image signals to the first frame synchronization signal of the image signal after changing the image signals. This enables a period of time to output the black screen to be made shortest.

Thus, although the image-signal-processing apparatus for processing the image signal has been described as the embodiments of the invention, this invention is not limited thereto: it is applicable to, foe example, an audio-signal-processing apparatus for processing audio signal.

Further, this invention is also applicable to an informational-signal-processing apparatus in which a plurality of functional blocks is used to perform a series of items of processing on an informational signal such as an image signal.

It should be understood by those skilled in the art that various modifications, combinations, sub-combinations and alterations may occur depending on design requirements and other factors insofar as they are within the scope of the appended claims or the equivalents thereof.

What is claimed is:

1. An informational-signal-processing apparatus, comprising:
    a plurality of functional blocks, each of the functional blocks being configured to perform a series of items of processing on an informational signal; and
    a control block configured to control operations of the functional blocks,
    wherein at least one of a set of distributions blocks is configured to distribute a global command, the set of distribution blocks consisting of the control block and one of the functional blocks, the global command being distributed to each of the plurality of functional blocks when the control block distributes the global command, the command being distributed to each of a remainder of the plurality of functional blocks when the one of the functional blocks distributes the global command;
    wherein each of the functional blocks that receives the global command operates adaptively based on the received global command; and
    wherein a first one of the functional blocks is configured to output a block-to-block synchronizing signal to a second one of the functional blocks that is configured to receive the global command at an output timing of a processed informational signal, the processing of the processed informational signal having been performed on the basis of the global command.

2. The informational-signal-processing apparatus according to claim 1, wherein an other one of the functional blocks is configured to perform an operation, based on the global command, on an informational signal output from a functional block of an antecedent stage after receiving a block-to-block synchronizing signal from the functional block of the antecedent stage.

3. The informational-signal-processing apparatus according to claim 1, wherein each of the functional blocks comprises:
    a processing unit that processes the informational signal; and
    a processing control unit that controls operation of the processing unit,
    wherein the processing control unit includes:
        a global command reception section that receives the global command;
        a reception queue that stores the global command received at the global command reception section;
        a command-executing section that executes the global command stored in the reception queue;
        a processing-delay queue that stores the block-to-block synchronizing signal, said synchronizing signal corresponding to the global command that has been executed in the command-executing section; and
        a block-to-block synchronizing signal transmitting section that fetches and transmits the block-to-block synchronizing signal stored in the processing-delay queue at a timing when the processing unit outputs the processed informational signal that has been performed on the basis of the global command.

4. The informational-signal-processing apparatus according to claim 3, wherein each of the functional blocks further comprises a block-to-block synchronizing signal reception section that receives the block-to-block synchronizing signal output from a functional block of an antecedent stage; and
    wherein the command-executing section executes the global command stored in the reception queue when the block-to-block synchronizing signal reception section receives the block-to-block synchronizing signal.

5. A functional block, comprising:
    a global command reception section configured to receive a global command transmitted to the functional block and a functional block of an antecedent stage;
    a block-to-block synchronizing signal reception section configured to receive a block-to-block synchronizing signal output from the functional block of the antecedent stage at an output timing of a processed informational signal, the processing of the processed informational signal having been performed by the functional block of the antecedent stage on the basis of the received global command; and
    a processor configured to process an informational signal by operating adaptively based on the received global command.

6. The functional block according to claim 5, wherein the functional block is configured to perform an operation, based on the global command, on an informational signal output from the functional block of the antecedent stage after receiving the block-to-block synchronizing signal from the functional block of the antecedent stage.

7. The functional block according to claim 5, wherein the functional block comprises:
   a processing control unit that controls operation of the processing unit,
   wherein the processing control unit includes:
      the global command reception section;
      a reception queue that stores the global command received at the global command reception section;
      a command-executing section that executes the global command stored in the reception queue;
      a processing-delay queue that stores the block-to-block synchronizing signal, said synchronizing signal corresponding to the global command that has been executed in the command-executing section; and
      the block-to-block synchronizing signal transmitting section, which fetches and transmits the block-to-block synchronizing signal stored in the processing-delay queue at a timing when the processing unit outputs the processed informational signal that has been performed on the basis of the global command.

8. The functional block according to claim 7, wherein the command-executing section executes the global command stored in the reception queue when the block-to-block synchronizing signal reception section receives the block-to-block synchronizing signal.

9. A method of controlling a functional block that processes an informational signal by operating adaptively based on a global command, the method comprising:
   receiving the global command, which was transmitted to the functional block and a functional block of an antecedent stage;
   receiving a block-to-block synchronizing signal output from the functional block of the antecedent stage at the functional block at a timing when a processed informational signal is output, the processing of the processed informational signal having been performed by the functional block of the antecedent stage on the basis of the global command; and
   executing the received global command.

10. The method of controlling functional block according to claim 9, wherein in the receiving the global command, the global command is executed when the block-to-block synchronizing signal is received.

* * * * *